United States Patent
O'Connell et al.

(10) Patent No.: US 11,404,802 B2
(45) Date of Patent: *Aug. 2, 2022

(54) LOCKING GROUNDING CLAMP

(71) Applicant: Quanta Associates, L.P., Houston, TX (US)

(72) Inventors: Daniel Neil O'Connell, Burnaby (CA); Phillip Howard Quaedvlieg, Burnaby (CA); David Karl Wabnegger, Burnaby (CA); Janos Csaba Toth, Vancouver (CA); Ian Edward Trip, Penticton (CA); Ronald F. Howarth, Penticton (CA); Jolly Vincent Pangan Nepomuceno, Penticton (CA); Robert Dale Wicks, Penticton (CA)

(73) Assignee: Quanta Associates, L.P., Houston, TX (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/889,106

(22) Filed: Jun. 1, 2020

(65) Prior Publication Data

US 2020/0295476 A1   Sep. 17, 2020

Related U.S. Application Data

(63) Continuation of application No. 16/404,465, filed on May 6, 2019, now Pat. No. 10,673,152, which is a
(Continued)

(51) Int. Cl.
*H01R 4/66*    (2006.01)
*H01R 4/48*    (2006.01)
(Continued)

(52) U.S. Cl.
CPC ............. *H01R 4/66* (2013.01); *H01R 4/4863* (2013.01); *H01R 11/14* (2013.01); *H01R 43/22* (2013.01)

(58) Field of Classification Search
CPC ........ H01R 11/15; H01R 43/22; H01R 11/14; H01R 43/00; H02G 1/025
(Continued)

(56) References Cited

U.S. PATENT DOCUMENTS 2,966,817 A * 1/1961 Wengen ................ H02G 1/02
  81/53.1
3,923,363 A   12/1975 Kraft
(Continued)

FOREIGN PATENT DOCUMENTS

CL   200801955   9/2008
CL   201400970   8/2014
(Continued)

OTHER PUBLICATIONS

Corrales, Daniel, Supplementary European Search Report, dated Nov. 28, 2019, 18 pages, European Patent Office, The Hague, Netherlands.

*Primary Examiner* — Renee S Luebke
*Assistant Examiner* — Paul D Baillargeon
(74) *Attorney, Agent, or Firm* — Oathout Law Firm; Mark A. Oathout; Antony C. Edwards

(57) ABSTRACT

A grounding clamp includes a safety lock-out which locks the operation of the clamp in the absence of a cooperating hot-stick. The lock-out employs a clutch which prevents the translation of the clamping members relative to one another until the clutch is disengaged. The cooperating hot-stick is required for the disengagement of the clutch.

12 Claims, 21 Drawing Sheets

Related U.S. Application Data continuation-in-part of application No. 15/584,888, filed on May 2, 2017, now Pat. No. 10,283,882.

(60) Provisional application No. 62/330,377, filed on May 2, 2016.

(51) Int. Cl.
*H01R 11/14* (2006.01)
*H01R 43/22* (2006.01)

(58) Field of Classification Search
USPC ........ 439/477; 269/240, 245, 246, 249, 260; 81/53.1
See application file for complete search history.

(56) References Cited

U.S. PATENT DOCUMENTS

| | | |
|---|---|---|
| 4,196,960 A | 4/1980 | Gelfand |
| 5,096,438 A * | 3/1992 | Black ............... H01R 11/14 200/48 R |
| 6,943,291 B2 | 9/2005 | Brittain et al. |
| 7,111,526 B1 | 9/2006 | Flojo |
| 10,283,882 B2 * | 5/2019 | Quaedvlieg ............ H01R 11/15 |
| 10,673,152 B2 * | 6/2020 | O'Connell ............... H02G 1/02 |
| 2012/0214355 A1 | 8/2012 | De France |

FOREIGN PATENT DOCUMENTS

| | | |
|---|---|---|
| CN | 201611697 U | 10/2010 |
| CN | 202977776 U | 6/2013 |
| CN | 103401083 A | 11/2013 |
| CN | 203445269 U | 2/2014 |
| CN | 204441515 U | 7/2015 |
| FR | 2167245 A5 | 8/1973 |
| FR | 2719422 A1 | 11/1995 |
| IT | MI20120517 A1 | 9/2013 |

* cited by examiner

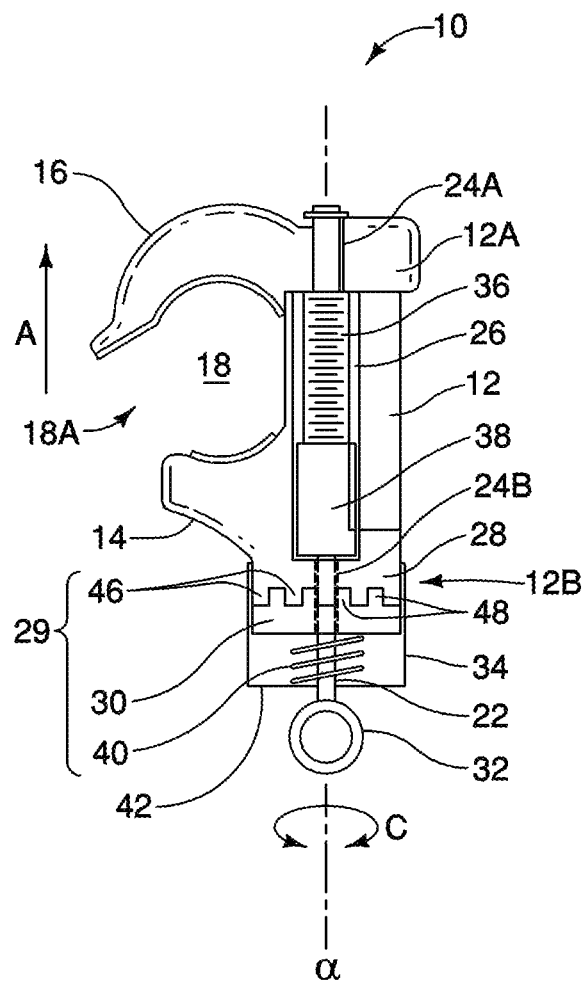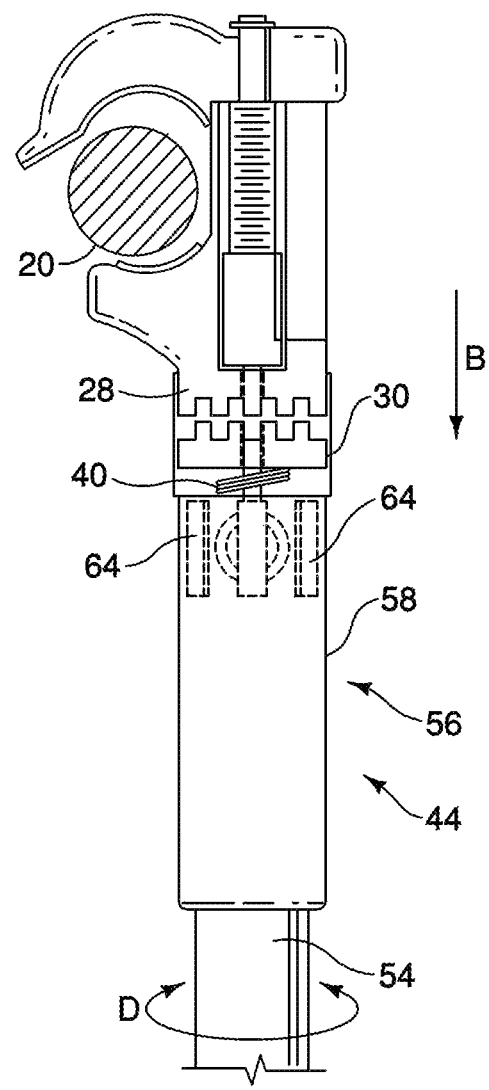
FIG. 1
FIG. 2

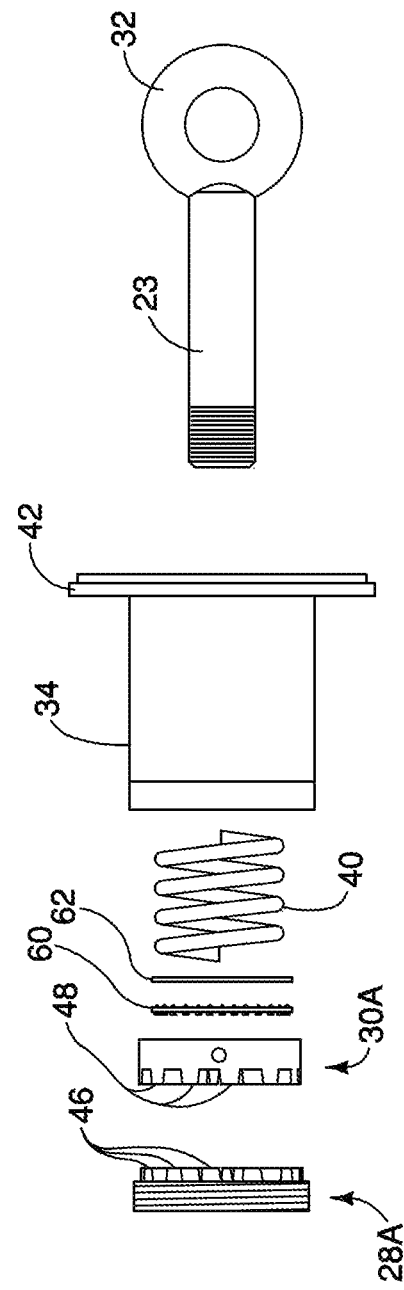
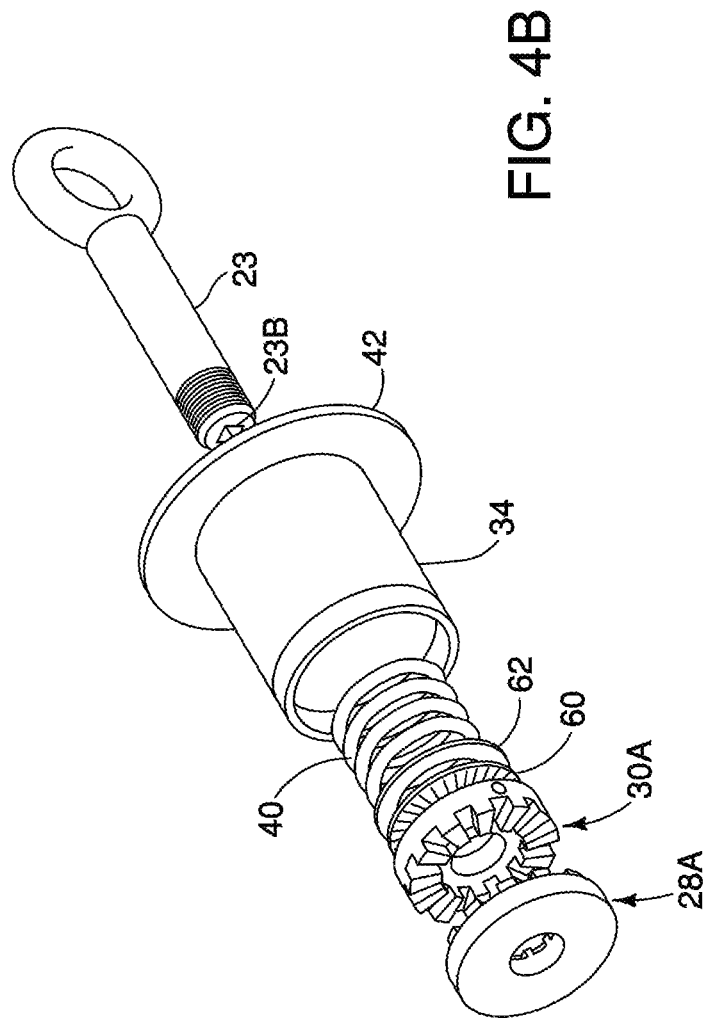
FIG. 4A
FIG. 4B

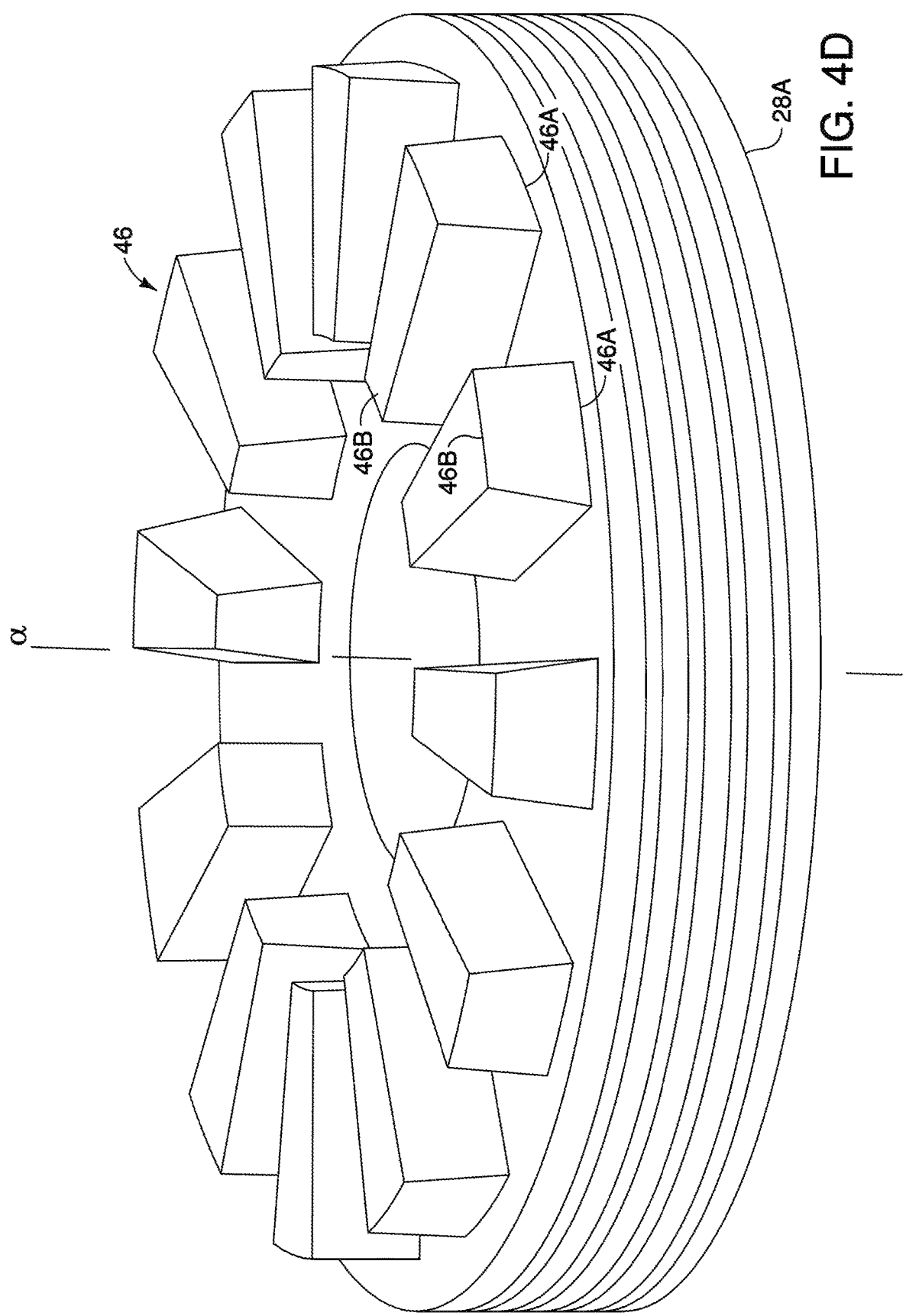

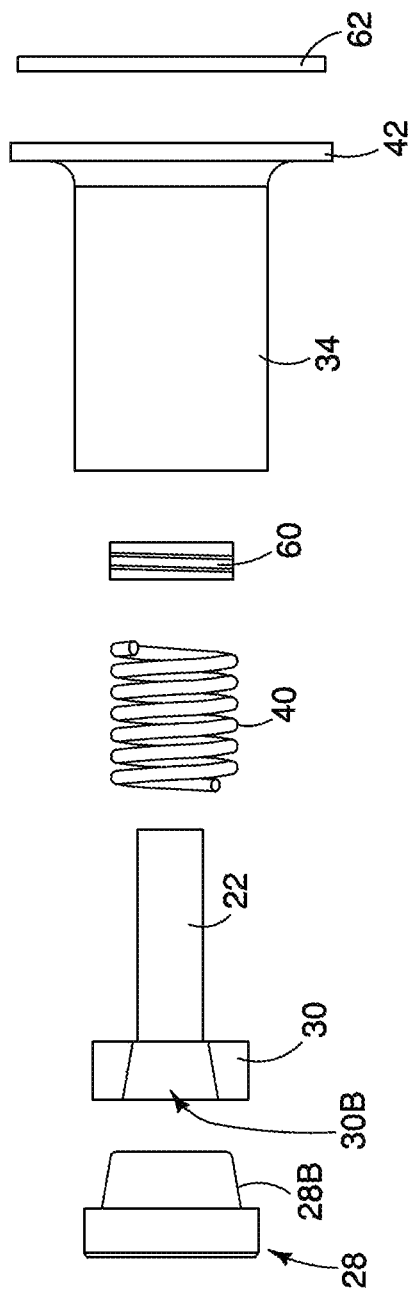

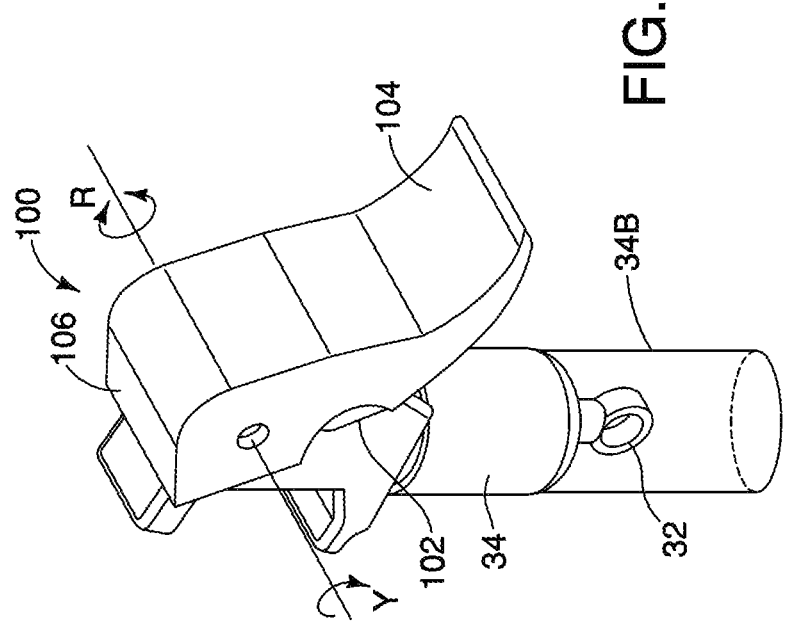
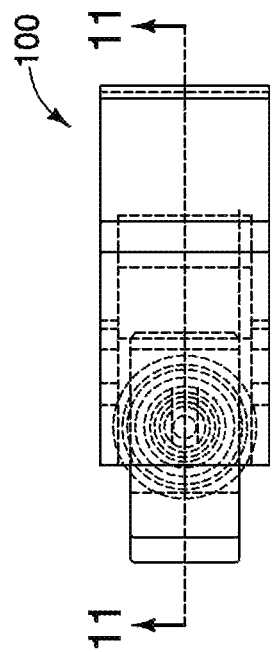
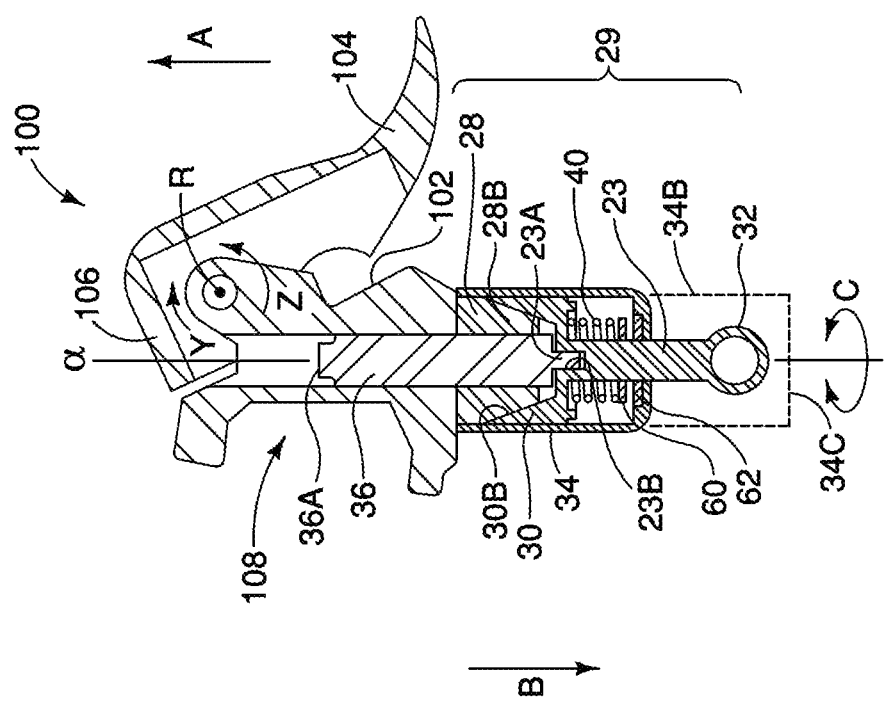
FIG. 12
FIG. 13
FIG. 11

LOCKING GROUNDING CLAMP

CROSS-REFERENCE TO RELATED APPLICATIONS

This is a continuation of U.S. patent application Ser. No. 16/404,465 filed May 6, 2019. U.S. patent application Ser. No. 16/404,465 is a continuation-in-part of U.S. patent application Ser. No. 15/584,888 filed May 2, 2017. U.S. Ser. No. 15/584,888 claims priority from U.S. Provisional Patent Application No. 62/330,377 filed May 2, 2016. Entireties of all the applications referred to in this paragraph are incorporated herein by reference.

FIELD

The present disclosure is generally in the field of grounding clamps used for grounding high voltage conductors. More particularly, the present disclosure relates to grounding clamps which have lock-outs so that the clamps are actuable only through the use of an insulated line tool so as to inhibit unsafe use of the grounding clamp by a lineman.

BACKGROUND

Electrical workers such as linemen use grounding cables to help manage dangerous voltages and currents in de-energized power lines and electrical equipment. Ground clamps, which are used to make the grounding connection, are intended to be installed and removed using an insulating tool, for example an insulating tool called a Grip-All™ stick or Shotgun or hot-stick, to keep the worker at a safe distance from the electrical hazard.

When installing grounds, the first connection is always made to a ground point. Workers will normally make this connection by hand, rather than with an insulating tool, as there is no hazardous energy when making this connection.

Any time a connection is made to a conductor or apparatus that could be at a different electrical potential from the ground, this connection must be made using an insulating tool. This is especially true in a high voltage environment; for example, in excess of 69 kV. However, due to the design of conventional ground clamps, they may be installed and removed by hand rather than by using an insulating tool. It is not uncommon, in the applicant's experience, for workers to make the mistake of installing a ground clamp on a conductor, or removing one from a conductor by hand, rather than using an insulating tool. This may expose the worker to a voltage potential and may result in electrocution of the worker. To the applicant's knowledge, installing or removing a ground clamp by hand has resulted in electrocution incidents and fatalities in the industry.

Consequently, there is a need in the industry for a locking ground clamp that only operates in combination with an insulating tool, so as to prevent the worker or lineman from being able to operate the ground clamp without the use of the insulating tool. This is to inhibit workers or linemen from attempting to install or remove the grounding clamp by hand.

SUMMARY

To accomplish a locking mechanism for a grounding clamp, safety lock-outs are described below which prevent manual operation of a grounding clamp. As described herein, a locking grounding clamp can only be actuated or un-locked with, or in the cooperating presence of, an insulating tool. A locking grounding clamp (herein, also referred to as a "grounding clamp" or a "grounding clamp assembly"), includes a safety lock-out which locks the operation of the clamp in the absence of an electrically insulating tool such as a hot-stick. The clamp includes a frame and a pair of clamping members, such as a fixed jaw and a movable jaw, defining a capture cavity for capturing a conductor. The cavity has an opening between the clamping members through which the conductor is positioned into, or removed from, the cavity. Thus, the opening provides access into the cavity for a conductor to be captured in the cavity by a lineman operating the hot-stick. A first clamping member may be a movable jaw which cooperates with the frame, and is selectively biasable by a user between an unclamped position, wherein the first clamping member is retracted; and a clamped position wherein, by translation of the first clamping member relative to the frame, the conductor is clamped between the pair of clamping members when the conductor is positioned in the cavity.

The lock-out has first and second positions and cooperates with the first clamping member to prevent the selective biasing of the first clamping member from the unclamped position to the clamped position, and from the clamped position to the unclamped position, when the lock-out is in the locked or first position. The lock-out is normally biased into the locked or first position. When the lock-out is in the unlocked or second position, the selective biasing of the first clamping member between the clamped and unclamped positions is enabled.

In an embodiment of the present disclosure, a grounding clamp system comprises a grounding clamp having at least one movable jaw and a first actuator for selectively closing and opening the at least one movable jaw relative to a second jaw, whereby a conductor is selectively captured and released from the clamp. The grounding clamp also includes a lock-out for preventing operation of the first actuator while the lock-out is locked, and enabling operation of the first actuator while the lock-out is released. An electrically insulated pole, such as for example a hot-stick, has a head at a head end of the pole and an opposite handle end, the head including a coupler mounted in the head and having a corresponding actuating linkage extending from the head along the pole. Second and third actuators are mounted on the handle end of the pole, wherein the second actuator cooperates with the actuating linkage to actuate the coupler, and actuation of the second actuator engages the coupler with the lock-out of the grounding clamp, drawing the lock-out onto the head so as to couple the grounding clamp onto the head. The third actuator further cooperates with the actuating linkage and is adapted to be actuated sequentially after the actuation of the second actuator, so as to release the lock-out and thereby allow actuation of the first actuator. The lock-out may include a clutch; the clutch may be chosen from a group comprising: a toothed clutch, splined clutch, friction clutch, magnetic clutch.

In some embodiments, the clutch may include two mating members, wherein a second mating member of the two mating members is coupled to a pull, and wherein the coupler in the head of the pole engages with the pull when the second actuator is engaged. Actuation of the third actuator tensions the pull, and the pull and the second mating member move against a return biasing resilient spring when tensioned by the third actuator, so as to disengage the two mating members from one another to release the clutch upon tension on the pull overcoming a spring force of the spring. The spring force of the spring may be sufficiently strong so as to prevent a user from manually tensioning the pull by hand to overcome the spring force. In some embodiments, the spring force is substantially equal to or greater than 100 pounds force (lbf).

The first actuator may include a shaft and the grounding clamp may include a frame, wherein the shaft translates relative to the frame, actuating the movable jaw upon actuation of the first actuator. The second actuator may be a selectively translatable sleeve slidably mounted on the pole, and the actuating linkage may be coupled to the sleeve so that translation of the sleeve along the pole correspondingly translates the linkage. In some embodiments, the linkage includes a rod and the coupler includes a hook, wherein the hook is mounted to a shuttle that is coupled to the rod and is slidably mounted within the head, so that translation of the rod by translation of the sleeve correspondingly translates the shuttle within the head. The hook may be pivotally mounted on the shuttle so that retraction of the shuttle into the head causes the hook to rotate into a closed position. The pull may be adapted to releasably couple to the hook and to be locked into the head upon retraction of the shuttle by retraction of the sleeve along the pole. In some embodiments, the pull includes an eye and the hook engages through the eye.

In some embodiments, the second actuator provides a first stage pulling tension on the pull, via the linkage, sufficient to rigidly couple the grounding clamp onto the head of the pole and substantially align the pull with the pole. In further embodiments, the third actuator sequentially further tensions the pull after actuation of the second actuator so as to overcome the spring force acting on the clutch to keep the clutch locked. Additionally, the second actuator may include a first toothed rail and a ratchet cooperating therewith to selectively position the sleeve along the pole and selectively lock the position of the sleeve along the first toothed rail. Also, the third actuator may include a second toothed rail and a pinion to apply the sequential further tension to the pull. In some embodiments, a lever is mounted to the pinion so as to provide a mechanical advantage for the pinion, where the sequential further tension on the pull is sufficient to overcome the spring force acting on the clutch.

In some embodiments, the pinion has teeth in mating engagement with corresponding teeth on the second toothed rail. The teeth on the pinion only occupy a sector around the pinion, such that moving the lever from a first pull tensioning position to a second pull tensioning position, wherein the second pull tensioning position coincides with unlocking the lock-out, rotates the pinion's teeth along the sector, and wherein moving the lever beyond the second pull tensioning position to a release position releases the pinion's teeth as the toothed sector is rotated out of engagement with the teeth on the second toothed rail, resulting in release of the tensioning of the pull by the third actuator.

BRIEF DESCRIPTION OF THE DRAWINGS

FIG. 1 is a partially cut away view, illustrating an embodiment of the present disclosure with the lock-out in a locked position.

FIG. 2 is a partially cut away view, illustrating an embodiment of the present disclosure with the lock-out in an unlocked position.

FIG. 4A is an exploded side elevation view of an embodiment of a lock-out having a toothed clutch.

FIG. 4B is an exploded isometric view of the lock-out of FIG. 4A.

FIG. 4D is a perspective view of one of the crown gears of FIG. 4C.

FIG. 5 is an exploded side elevation view of an embodiment of a lock-out having a friction clutch.

FIG. 11 is a sectional view along line 11-11 in FIG. 13.

FIG. 12 is a perspective view showing the grounding clamp of FIGS. 10, 11 and 13.

FIG. 13 is a top plan view of the embodiment of the grounding clamp seen in FIG. 10.

DETAILED DESCRIPTION

Figure 3:
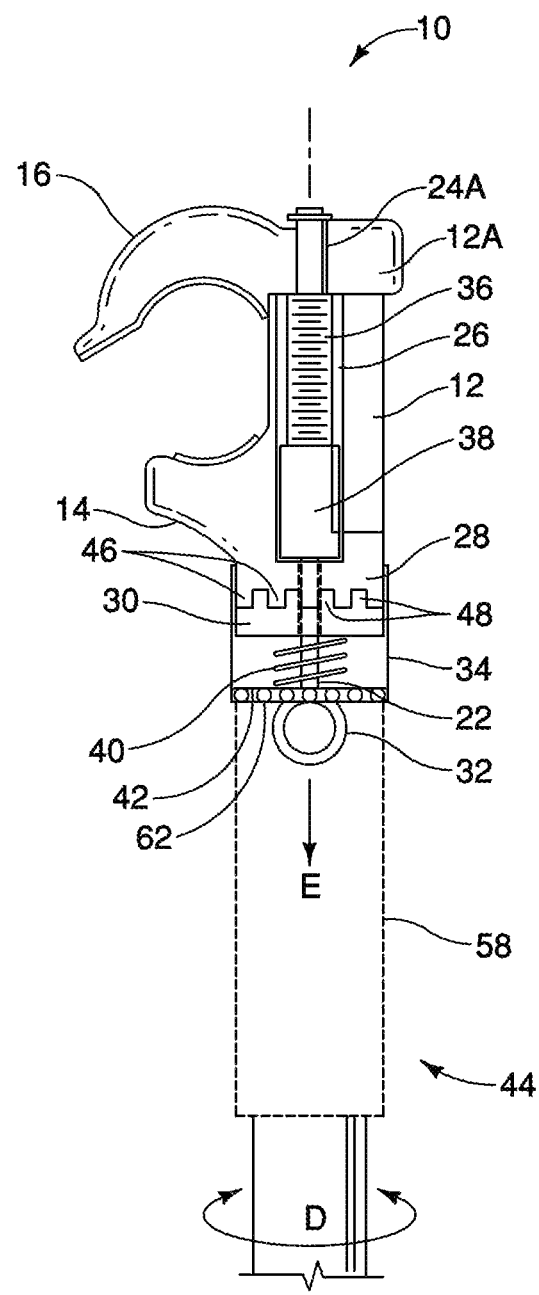
FIG. 3 is a partially cut away view, illustrating an alternative embodiment of the grounding clamp of FIG. 1, with the lock-out in the locked position.

In an embodiment of the present disclosure, a locking grounding clamp 10 such as seen in FIG. 1 includes a frame 12 supporting a lower clamping member 14 (otherwise referred to as a movable jaw) and an upper clamping member 16 (otherwise referred to as a second or fixed jaw), the clamping members 14, 16 disposed at opposite ends of the frame 12. The clamping members 14, 16 and frame 12 define a capture cavity 18 therebetween having an opening 18A. The capture cavity 18 is sized to receive conductor 20, shown in cross section in FIG. 2, via opening 18A. Advantageously, capture cavity 18 conforms in shape, and so as to encircle, conductor 20.

Square cross-section shaft 22 is supported on or within the frame 12 and disposed alongside lower clamping member 14. Shaft 22 is journaled in upper opening 24A at the upper end 12A of frame 12, through a channel or cut-out 26 running along frame 12, and through a lower opening 24B in frame 12.

The grounding clamp 10 further comprises a lock-out 29 which selectively prevents manual operation of grounding clamp 10. The lock-out 29 includes first locking member 28 and second locking member 30, illustrated in FIGS. 1 and 2, by way of example, as the mating components of a toothed clutch (the first and second locking members 28, 30 also referred to herein as first and second mating members). Reference to a clutch 28, 30 herein is to the combination of the first and second locking members 28, 30 and to the other embodiments described below of the first and second locking members, numbered for reference (28A, 30A), (28B, 30B), (28C, 30C). The second locking member 30 is mounted adjacent first locking member 28. Locking member 28 may be formed as a part of frame 12. The shaft 22 is square in cross-section where it is snugly journaled through a square opening (not shown) through the center of second locking member 30 so that rotating the shaft 22 also rotates locking member 30. A pull, such as a coupling eye 32, is mounted to or formed at the lower end of shaft 22. Shaft 22 extends through spring housing 34. The square cross-sectioned portion of shaft 22 is also snugly journaled through a correspondingly-sized square cross-section bore through the centre of a threaded shaft 36. Threaded shaft 36, having exterior threads, is slidably and snugly coupled onto shaft 22, whereby rotating the shaft 22 in direction C about a rotational axis alpha (α), extending through and along the centre of the shaft 22, results in rotating the threaded shaft 36 in the same rotational direction as rotation of shaft 22. Shaft 22 is free to rotate within openings 24A, 24B and within channel 26. Advantageously, openings 24A, 24B may be round.

A threaded bore is formed through collar 38. Collar 38 is coupled to the lower clamping member 14. The threading of the threaded bore, in collar 38, rotatably mates with the threading on the external surface of the threaded shaft 36. Thus, an electrically insulating tool, such as a so-called hot-stick, grasping the coupling eye 32 and rotating the coupling eye 32 and the shaft 22 in direction C about the axis of rotation alpha, results in rotation of both the shaft 22 and the threaded shaft 36. Rotation in a first direction about axis alpha, urges lower clamping member 14 in direction A towards upper clamping member 16. Thus, lower clamping member 14 serves as a movable jaw. Rotating the coupling eye 32 in a second direction, opposite the first direction, translates lower clamping member 14 in direction B, away from upper clamping member 16, wherein upper clamping member 16 serves as a fixed jaw.

As stated above, second locking member 30 is disposed adjacent the first locking member 28 of the frame 12, and has a square channel through its centre. The square channel in second locking member 30 is sized so as to snugly, slidably receive the square cross-section portion of shaft 22. Second locking member 30 thus also rotates in direction C, along with the rotation of shaft 22, about the rotational axis alpha.

In some embodiments, rather than providing a square shaft 22 which includes an integrally formed coupling eye 32, a rounded shaft 23 having a coupling eye 32 formed at one end of shaft 23, and a square cross-sectional keyway 23B for receiving a square cross-sectional key 23A, formed at the opposite end of shaft 23, may be provided, as shown for example in FIGS. 4A, 4B and 11. Such an alternative embodiment is a further example of providing for selective rotation of the threaded shaft 36 to actuate the movable jaw or clamping member 14 by rotating the eye 32, about rotational axis alpha. The present disclosure is not limited to shafts, or corresponding key and keyway components, having square cross-sections. For example, in other embodiments (not illustrated), the cross-section of the shaft 22, or alternatively the key 23A and keyway 23B, may each have any geometry enabling a releasable coupling between the shaft (or key) and the corresponding component (or keyway) so as to allow for selective rotation of the corresponding components upon rotation of the eye 32.

Referring again to FIGS. 1 and 2, a second locking member 30 and spring 40 are located within spring housing 34, which is in or adjacent the lower end 12B of frame 12 adjacent to coupling eye 32. Spring 40 is disposed between the base 42 of spring housing 34 and second locking member 30. Spring 40 may be a coil spring which surrounds the shaft 22. The spring 40 resiliently biases second locking member 30 towards the first locking member 28, causing first locking member 28 to releasably couple with second locking member 30. Thus, when second locking member 30 is biased against first locking member 28, the coupling prevents rotation of second locking member 30 relative to the frame 12 and first locking member 28, thereby also preventing rotation of shaft 22 about rotational axis alpha. This prevents linear translation of lower clamping member 14 relative to the frame 12, and thus prevents movement of the lower clamping member 14 relative to the upper clamping member 16 of the grounding clamp 10. It is one embodiment of what is referred to herein as a lock-out 29, and describes one embodiment of what is referred to herein as a clutch.

It is understood that reference herein to a lock-out 29 is intended to mean a mechanism preventing the use of the grounding clamp 10 by disabling the clamping mechanism unless and until the grounding clamp is operatively coupled to a hot-stick 44 or other elongate electrically insulating tool, so that a lineman cannot operate the grounding clamp 10 without the use of the hot-stick 44 or other elongate insulating tool. As will be appreciated by those skilled in the art, many variations of the lock-out 29 mechanism are possible. What follows are some examples of lock-outs 29 employing clutches.

Magnetic Clutch Embodiment

In an embodiment of the present disclosure, as seen in FIGS. 1-2, a ferrous second locking member 30 may be employed with any of the mechanical clutches described below. For example, the lock-out 29 illustrated in FIGS. 1 and 2 employs a magnetic clutch, wherein second locking member 30 is ferrous, and both the first locking member 28 and second locking member 30 have, respectively, interlockable teeth 46, 48. Operation of the magnetic clutch requires actuation by a hot-stick 44 having a magnetic actuator.

Toothed Clutch Embodiment

Figure 4C:
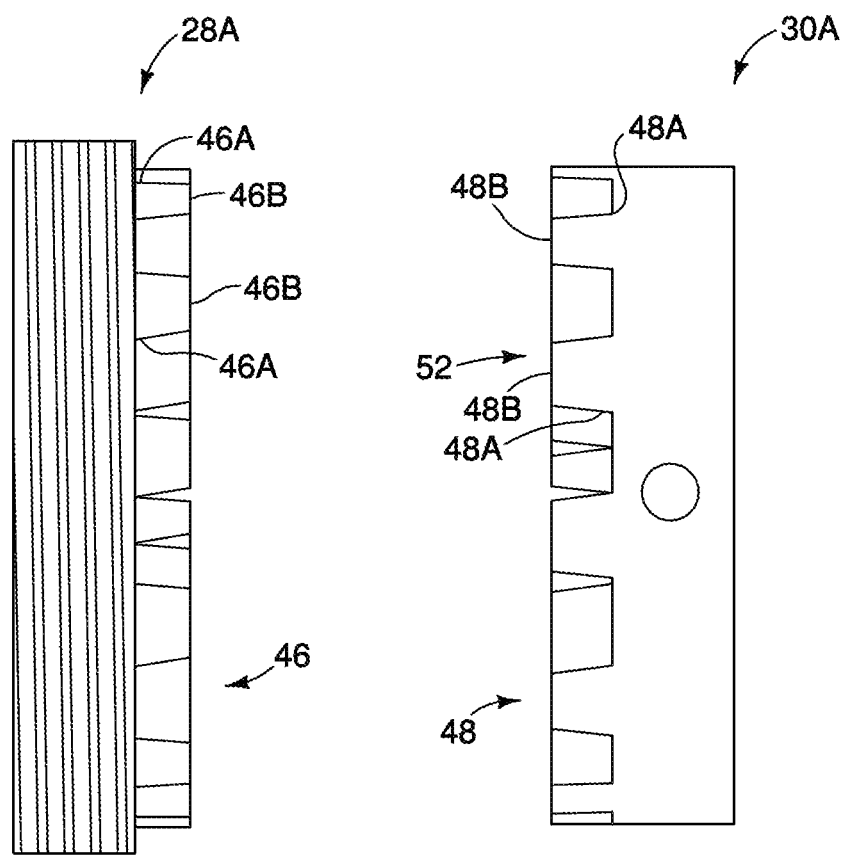
FIG. 4C is an enlarged view of a portion of FIG. 4A.

In an exemplary embodiment of the present disclosure, and without intending to be limiting, the first locking member 28 and second locking member 30 may, as already mentioned, include teeth 46, 48 respectively. As illustrated in FIGS. 3 to 4B, second locking member 30 includes a plurality of teeth 48, and first locking member 28 similarly comprises a plurality of teeth 46. The teeth 46 on first locking member 28 are in opposed facing relation so as to complement the teeth 48 on second locking member 30, such that when second locking member 30 is urged towards the first locking member 28, teeth 46 releasably interlock, or mate, with teeth 48. In particular, teeth 46 interleave between teeth 48, thereby preventing rotation of second locking member 30 relative to first locking member 28 and frame 12. As before, the square cross-sectioned portion of shaft 22 is journaled in a hollow threaded shaft 36 and provides a movable connection, for example a telescopic coupling, to the threaded collar 38. The spring 40 is advantageously a stiff spring to maintain the lock-out 29 in the locked position and to prevent manual unlocking of the second locking member 30. As used herein, manual unlocking generally means unlocking by a user with his hands only, in the absence of using a tool. As seen in FIG. 4C, teeth 46 and 48 may be tapered for ease of meshing together of the two opposed facing crown gears 28A and 30A, being embodiments of first and second locking members 28, 30 respectively. The teeth may be tapered so as to be wider at their base (46A, 48A) and narrower at their vertices (46B, 48B) as viewed looking radially inwardly. The teeth may also be tapered so as to become wider as their radial distance from axis α increases, such as seen in FIG. 4D.

This toothed embodiment is a form of clutch. As used herein, the clutch may be biased into a locked position, wherein there is no slippage of the clutch, by a resilient biasing or mating together of two mating members of the clutch, one against another. In one embodiment, not intended to be limiting, a spring, such as a coil spring, may provide the resilient biasing. The safety aspect of using a resiliently biased clutch resides in the strength of the resilient biasing being such that decoupling of the clutch or slippage of the clutch merely by hand; that is, without the assistance of a hand tool, is prevented. Thus, if the resilient biasing is provided by a spring, the spring strength is such that a user, such as a lineman, does not have the strength to decouple the clutch or cause it to slip by hand force alone, without the use of an electrically insulated tool, such as a hot-stick adapted for the purpose of decoupling the clutch. A determined user may be able to find a tool which may overcome the resilient biasing force maintaining the clutch in a coupled, or locked, position. However, in that event it is intended to occur to the user that using the proper tool, such as an adapted hot-stick, is relatively just as convenient, and safer, than using an alternative tool.

Friction Clutch Embodiment

As seen in FIGS. 5 and 11, a friction clutch may be used to achieve a lock-out 29. First locking member 28 includes a tapered member 28B that fits in a male-female engagement into a correspondingly tapered socket 30B formed in second locking member 30. The matching taper and socket creates a friction clutch, also sometimes referred to as a Morse taper. When second locking member 30 is biased towards first locking member 28, the tapered sections of both members 28, 30, engage, forming a lock-out 29.

Splined Clutch Embodiment

Figure 6:
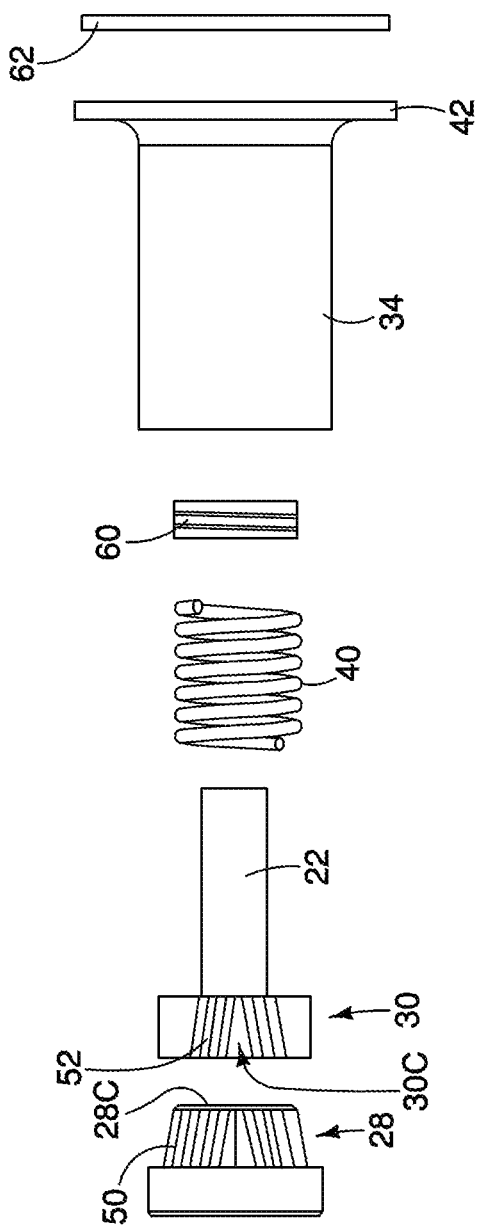
FIG. 6 is an exploded side elevation view of an embodiment of a lock-out having a splined clutch.

In a further alternative embodiment, as seen in FIG. 6, the first locking member 28 includes a tapered splined member 28C that fits in a male-female engagement into a correspondingly tapered splined socket 30C formed in second locking member 30. The first locking exterior splines 50 on splined member 28C mate with complementary interior splines 52 on splined socket 30C so as to releasably interlock and thereby form a releasable splined clutch.

Hot-Stick Embodiments

As stated above, an elongate electrically insulated tool, such as a hot-stick 44, is required to operate the grounding clamp 10. As illustrated in FIGS. 2 and 3, hot-stick 44, which includes an electrically insulated elongate body or pole 54 and head 56, may also include a coupling clamp 58. A bearing 60 (shown, for example, in FIGS. 4A to 6), within bearing interface 62, may be incorporated into the end of the insulating hot-stick 44. Grounding clamp 10 interfaces with the hot-stick 44, for example into the base 42 of spring housing 34, to allow twisting rotation of the hot-stick 44 when under the spring tension. When operating a clamp 10 with a magnetically actuated clutch, hot-stick 44 will include at least one magnet 64 (shown in dotted outline in FIG. 2). One or more magnets 64 and the coupling clamp hook 58A (seen in FIGS. 7-9) are disposed within the head 56.

Figure 7:
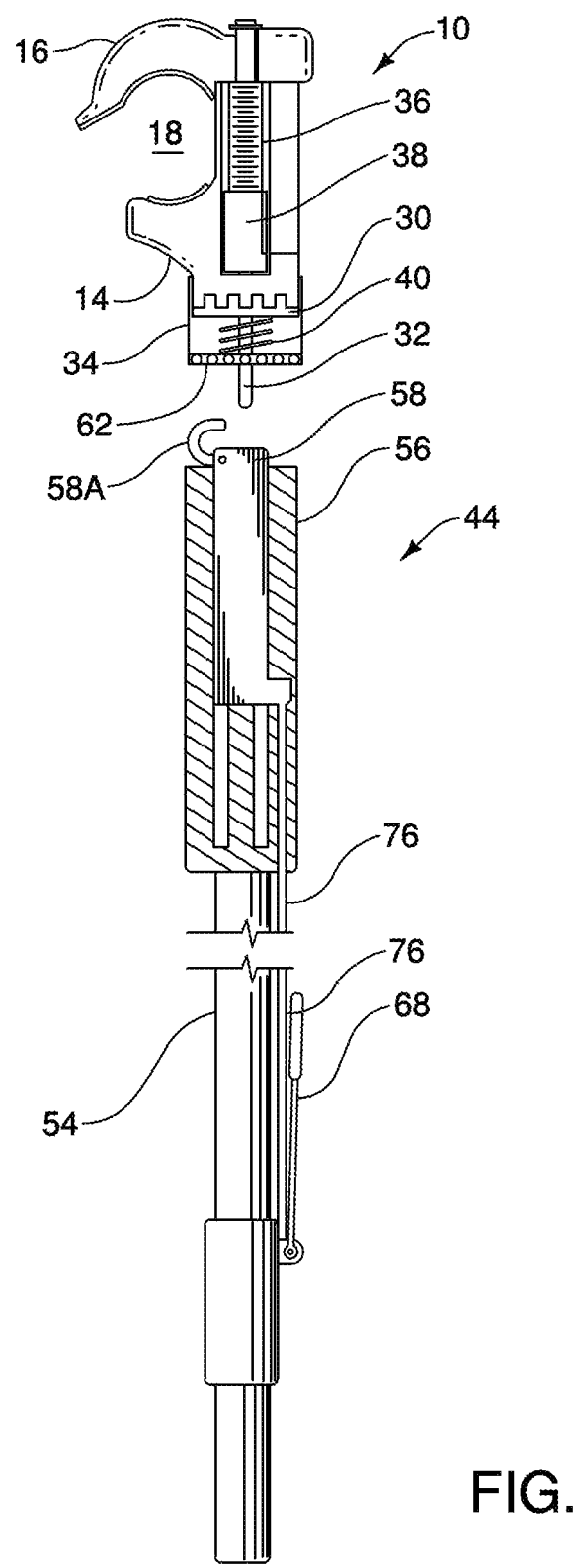
FIG. 7 is a partially cut-away view of an embodiment of a hot-stick ready for mounting to the grounding clamp of FIG. 3.
Figure 8:
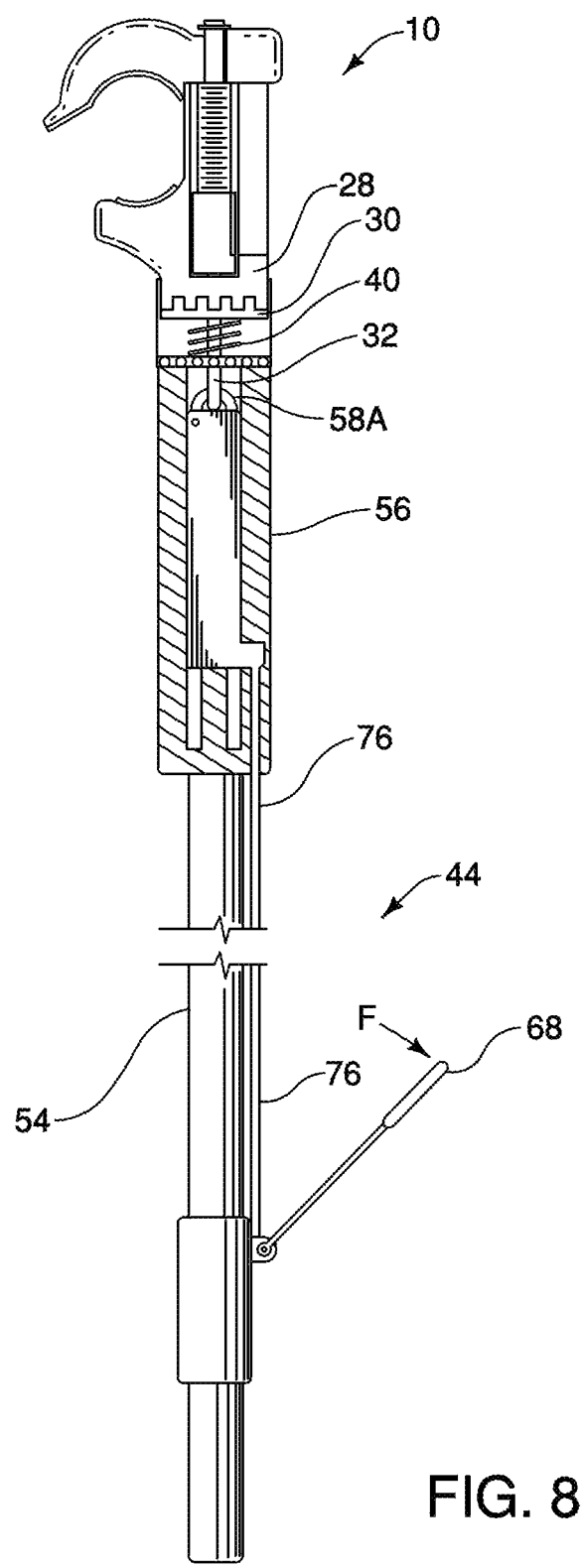
FIG. 8 is the grounding clamp and hot-stick of FIG. 7 illustrating the grounding clamp coupled to the head of the hot-stick, and with the lock-out in the locked position.

By way of example, and without intending to be limiting, a lineman seeking to operate the grounding clamp 10, with a magnetically actuated, toothed clutch, such as illustrated in FIG. 2, will grasp the insulated body 54 of a hot-stick 44 and manipulate the coupling clamp 58 so as to couple the coupling clamp hook 58A to the coupling eye 32, as shown in FIGS. 7 and 8. Upon coupling the coupling clamp 58 to the coupling eye 32, the plurality of magnets 64 disposed within the head 56 of the hot-stick 44 attract second locking member 30 in direction B, causing the plurality of teeth 46 on locking member 28 to uncouple from the plurality of teeth 48 on locking member 30. Once second locking member 30 becomes uncoupled from locking member 28, the shaft 22 may be freely rotated. By rotating, using a twisting motion in direction D about the length (or longitudinal axis alpha) of hot-stick 44, the lineman may then rotate shaft 22 in direction C. This results in a corresponding rotation of the threaded shaft 36, thereby causing clamping member 14 to translate linearly in either direction A or direction B, depending on the direction of rotation of shaft 22. In this manner, the capture cavity 18 may be opened to receive a conductor 20 via opening 18A or closed to enclose a conductor 20 within cavity 18 when the coupling clamp 58 of the hot-stick 44 is coupled with the coupling eye 32 so as to disengage the lock-out clutch.

Once the grounding clamp 10 has either been engaged around or disengaged from a conductor 20, the lineman may unhook the coupling clamp 58 from the coupling eye 32 and remove the hot-stick 44 from the locking grounding clamp 10. By removing the hot-stick 44 from the grounding clamp 10, and therefore removing the magnetic field caused by the plurality of magnets 64 disposed within the head 56, the magnetic force causing the ferrous second locking member 30 to move in direction B is removed and therefore the spring force applied in direction A by spring 40 against second locking member 30 will once again resiliently urge locking member 30 in direction A towards locking member 28, whereby teeth 46 once again engage with teeth 48 and bring the grounding clamp 10 into the locking position, as shown in FIG. 1.

Figure 9:
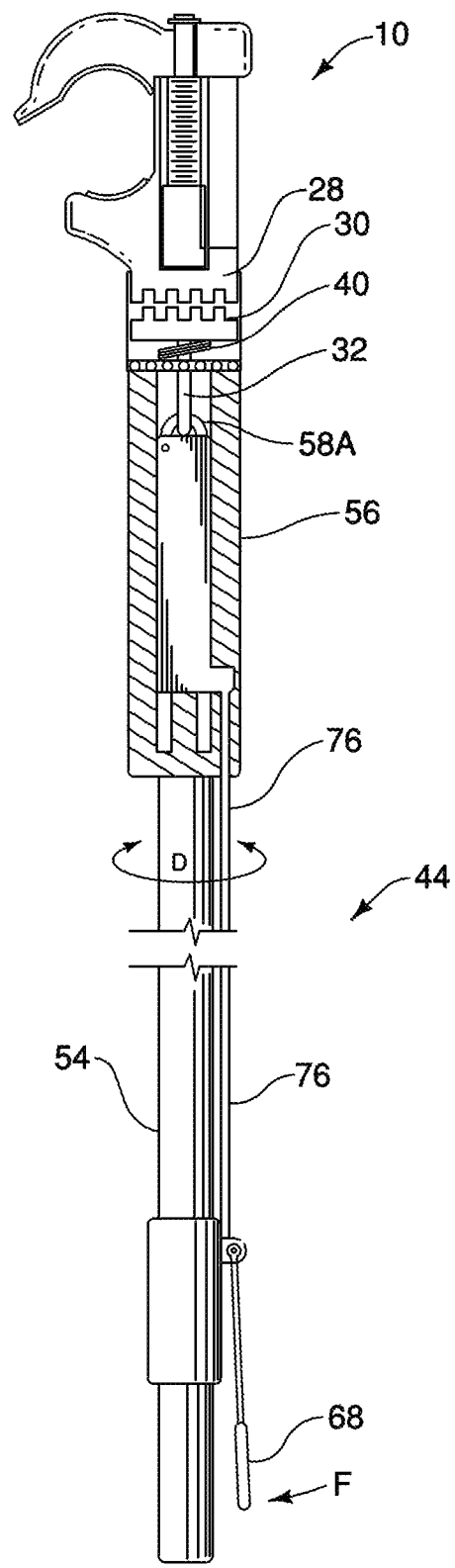
FIG. 9 is the grounding clamp and hot-stick of FIG. 8 with the lock-out unlocked by actuation of a lever and linkage on the hot-stick.

When an interlocking toothed clutch, friction clutch, or splined clutch are utilized without a magnetically actuated ferrous second locking member 30, the insulating hot-stick 44 may incorporate a lever 68 as seen by way of example in FIGS. 7-9. Lever 68 is adapted to overcome the stiff spring force of spring 40 and thereby release the lock-out 29 by means of a linkage, such as an actuating rod 76 operatively connected to the lever 68 and the hot-stick hook 58A, thereby uncoupling the first and second locking members 28, 30. This allows the ground clamp coupling eye 32 (into which hook 58A is coupled) to be turned in direction C to rotate the shaft 22, thereby opening or closing lower clamp member 14 onto the conductor 20. For example, as illustrated in FIG. 3, as coupling eye 32 is directly mounted to second locking member 30, pulling second locking member 30 in direction E by pulling on eye 32 retracts teeth 48 from interlocking between teeth 46. This then de-couples the clutch and allows twisting rotation of eye 32 using hot-stick 44 so as to open or close the clamp 10.

As shown in FIG. 8, when lever 68 is only partially actuated in direction F, the locking mechanism remains engaged as the second locking member 30 remains in its locked position. Partial actuation of lever 68 is not sufficient to overcome the force of spring 40. As shown in FIG. 9, once lever 68 is fully actuated in direction F, pulling on eye 32 de-couples second locking member 30 from first locking member 28, allowing a lineman to twist the hot-stick 44 to operate grounding clamp 10.

As discussed above and illustrated in FIG. 9, to unlock the grounding clamp 10, the lever 68 is fully actuated by pulling the lever 68 completely downwards in direction F so as to allow use of the grounding clamp by the lineman. Advantageously this may be an over-center position so that lever 68 remains lying flush along hot-stick 44 when released. Pulling the lever 68 downwards retracts the actuating rod 76, which is connected to the hook 58A on the upper end of the hot-stick 44, correspondingly down along hot-stick 44. Because hook 58A is coupled to eye 32, pulling the actuating rod 76 down also pulls down on eye 32 on the base end of the grounding clamp 10. Pulling down on eye 32 pulls down second locking member 30 so as to compress spring 40, which releases the second locking member 30 from its locked engagement with first locking member 28. The bearing 60 in bearing interface 62 (for example, as shown in FIG. 10) allows the hot-stick 44 to be twisted in direction D while under tension from the compressed spring 40.

Figure 10:
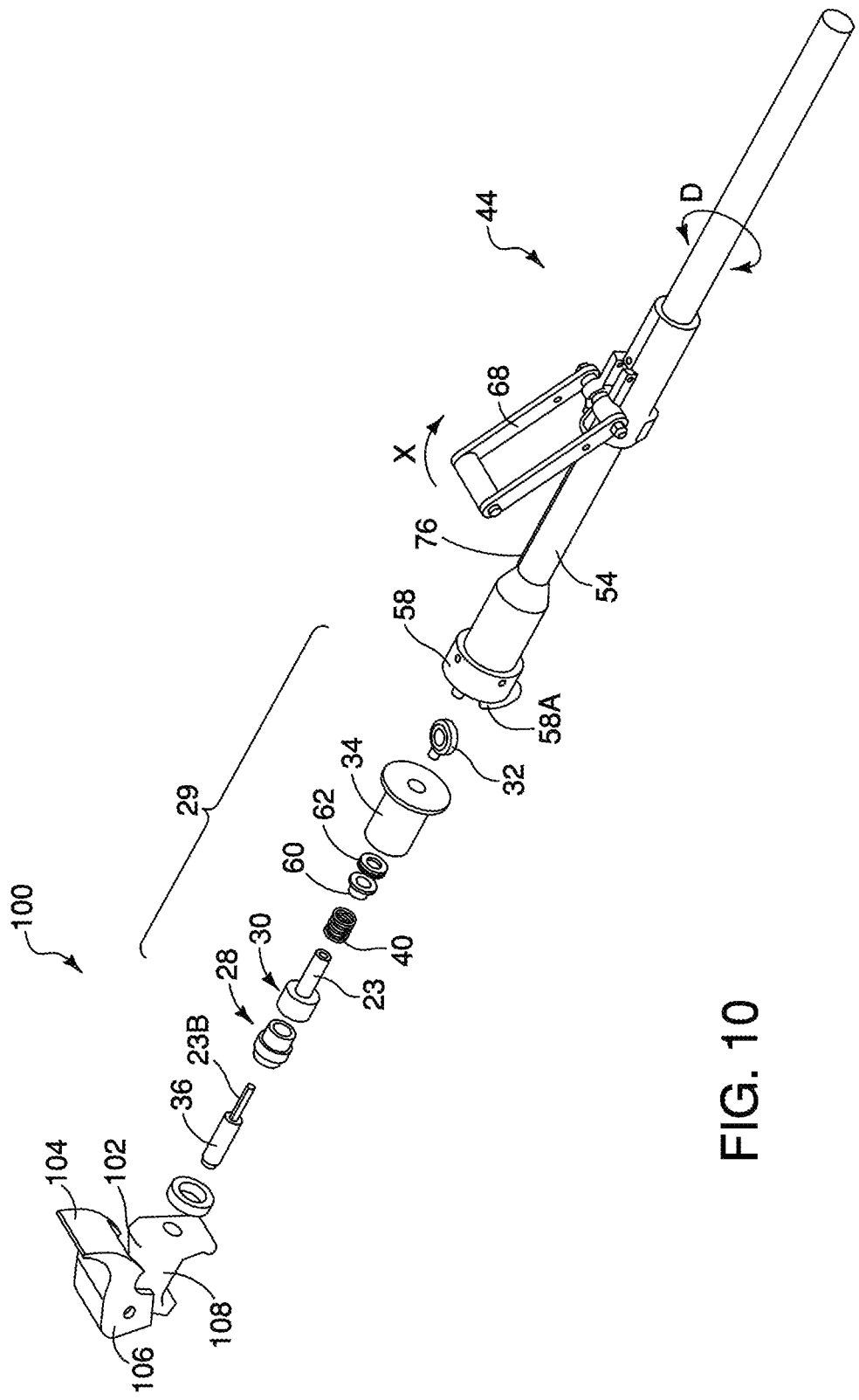
FIG. 10 is an isometric exploded view of an embodiment of the grounding clamp and a hot-stick and actuator adapted to couple with the grounding clamp.

As seen in FIG. 10, hot-stick 44 may include a selectively adjustable lever 68, adapted to slide along the body 54 of the hot-stick 44, such as in the manner better described below.

In another embodiment a universal joint (not shown) may be incorporated into the end of the insulating hot-stick 44 to allow operation when the hot-stick 44 and grounding clamp 10 are not in alignment; that is, not aligned longitudinally.

As will be appreciated by one skilled in the art, various other mechanisms may be employed to form or actuate a lock-out locking mechanism disabling the grounding clamp 10 so that the lock-out 29 will lock the operation of the clamp, unless in the presence of a cooperating insulating tool such as a cooperating hot-stick. For example, the lock-out 29 does not necessarily have to employ mating sets of teeth or splines as other clutches, including those relying on friction or adhesion between mating components, may also work. Further, the spring and magnet arrangement in the magnetically actuated lock-out 29 mechanism, described above, may be reversed. Also, the proximity or presence of the hot-stick 44, so as to unlock the lock-out 29, may operate other than by a magnetic field overcoming a resilient biasing of one locking component against another. For example, the mating of the hot-stick 44 with the clamp 10 may mechanically disengage a spring-loaded latch or clutch mechanism, wherein for example, a lever operated linkage on the hot-stick disengages or re-engages the clutch to thereby disengage or engage the lock-out 29 respectively, such as described below.

As illustrated in FIGS. 11-13, in a further embodiment of the grounding clamp 100, a downwardly extending skirt or cowling 34B extends from the spring housing 34 so as to cover the coupling eye 32. The use of skirt 34B is intended to inhibit a lineman from trying to insert a leverage tool, such as a screwdriver, into the eye 32 so as to defeat the lock-out 29. The skirt 34B is preferably rigid, or semi-rigid, and may be made of plastic. Advantageously the skirt 34B may be transparent or semi-transparent, so that a lineman may inspect for example the integrity of both the hook 58A connected to eye 32, and eye 32. The base edge 34C of skirt 34B may be just below the lowermost end of eye 32, or may extend further downwards towards, and in some embodiments so as to overlap, the upper end of the hot-stick when mounted thereon.

As viewed in FIGS. 10-13 (the optional skirt 34B being absent from FIG. 10), the grounding clamp 100 incorporates a friction clutch, such as the friction clutch more fully described above having a first locking member 28 featuring a tapered member 28B, and a second locking member 30 featuring a tapered socket 30B, wherein tapered member 28B is coupled to, or is an integral portion of, clamp body 108, while the tapered socket 30B is biased towards tapered member 28B by a spring 40 so as to engage member 28B and socket 30B to form a lock-out 29. A coupling eye shaft 23 is coupled to, or integrally formed with, coupling eye 32 and second locking member 30.

When the tapered member 28B is disengaged from the tapered socket 30B, such as described above in relation to FIG. 10, and the hook 58A is actuated by pulling the handle 68 downwardly in direction X, so as to engage eye 32, and then a downward force is applied to eye 32 in direction B so as to uncouple the tapered socket 30B from tapered member 28B. A threaded shaft 36 having a square cross-section key 23A, extending from the lowermost end of the shaft 36, remains coupled to a corresponding square cross-section keyway 23B, formed into the uppermost end of shaft 23 adjacent the threaded shaft 36. As such, when the first and second locking members 28, 30 are disengaged or unlocked, rotating eye 32 in direction C, about axis alpha, such as by rotating the insulated pole 54 of hot-stick 44, results in rotating the key 23A snugly received into keyway 23B, together with the threaded shaft 36. Depending on the direction of rotation, an upper end 36A of shaft 36 may travel upwardly in direction A when shaft 36 is rotated in a first rotational direction, or travel downwardly in direction B when shaft 36 is rotated in a second rotational direction, opposite the first rotational direction. Upper end 36A may travel in direction A towards the arm 106 of pivoting jaw 104 until it contacts arm 106 and urges arm 106 in direction A, thereby causing pivoting jaw 104 to pivot about its rotational axis R, in direction Y, so as to move pivoting jaw 104 towards fixed jaw 102 and thereby clamp a conductor 20 therebetween. To release a conductor 20 from grounding clamp 100, the pole 54 of hot-stick 44 is rotated in the second rotational direction so as to translate threaded shaft 36 downwardly in direction B, separating upper end 36A of the shaft 36 from arm 106 and allowing pivoting jaw 104 to rotate about its rotational axis R in rotational direction Z so as to increase the distance between pivoting jaw 104 and fixed jaw 102.

In embodiments having a mechanical clutch in the lock-out 29, for example where the clutch uses interlocking teeth as seen in FIGS. 3 to 4B, a user such as a lineman may use a modified hot-stick 44 such as seen in FIGS. 14-21 to, firstly, couple the head 56 of the hot-stick 44 to the base of the grounding clamp 10; and, secondly, to actuate the clutch actuator to unlock the clutch. Thereafter, while maintaining the actuation of the clutch in its unlocked condition, the hot-stick 44 is twisted in direction D about its longitudinal axis alpha (α) so as to actuate the movable jaw on the grounding clamp 10. The adaption of the hot-stick 44 thus preferably accommodates the two-handed operation of the hot-stick 44 and grounding clamp 10 combination so as to minimize the time it takes for, and awkwardness of, the twisting operation of the hot-stick about axis alpha.

Thus, in one preferred embodiment as seen in FIGS. 14-21, a first hot-stick actuator or hook closing actuator 70, on a hot-stick 44, is modified to piggyback a second actuator, the clutch actuator 72. The first hot-stick actuator 70 may include a sleeve 74 which is slidably mounted onto the elongate electrically insulated pole 54 of the hot-stick 44. The pole 54 extends from the handle or base end 44A of the hot-stick 44 to the opposite head end 44B, onto which the hot-stick head 56 is mounted.

Figure 16:
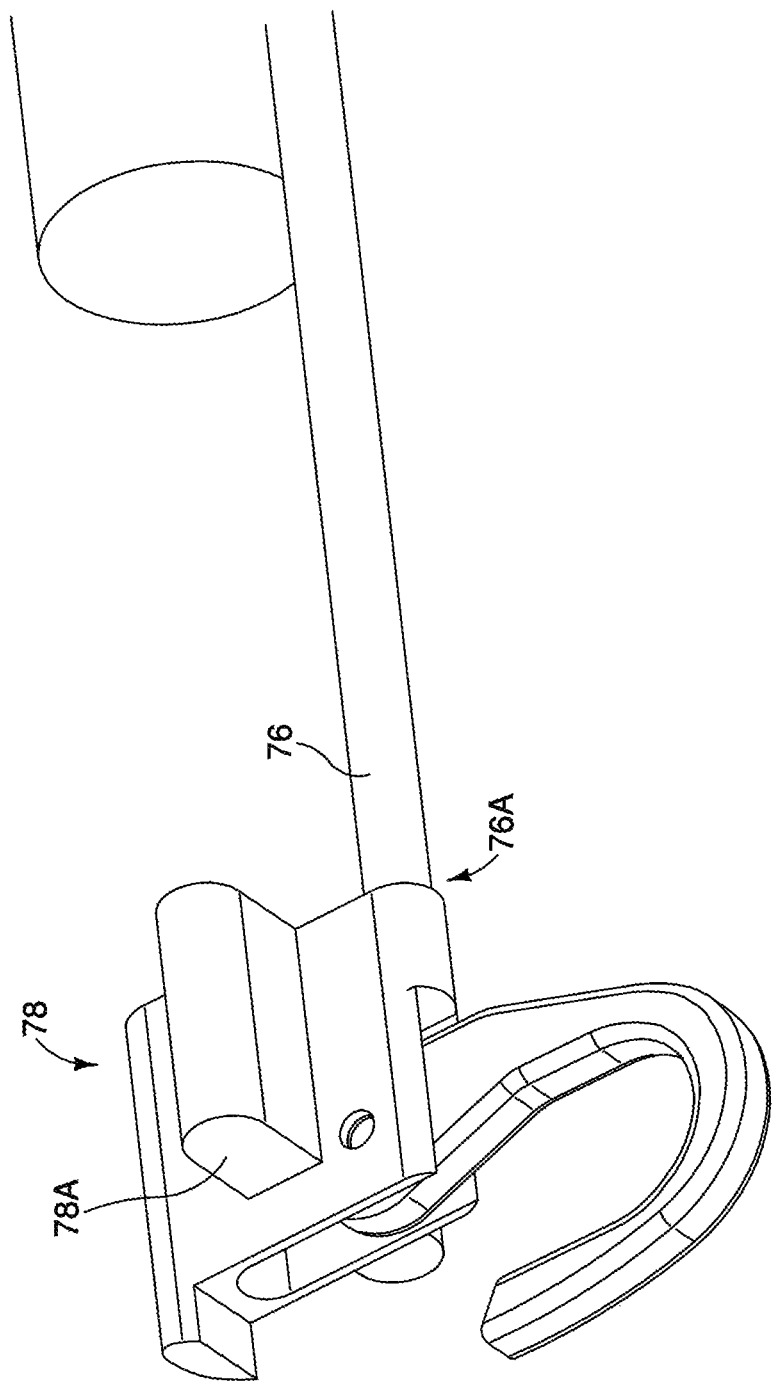
FIG. 16 is a close-up, partially cut-away view of a portion of the hot-stick tool shown in FIG. 14, displaying the shuttle and hook of the hot-stick tool.
Figure 17:
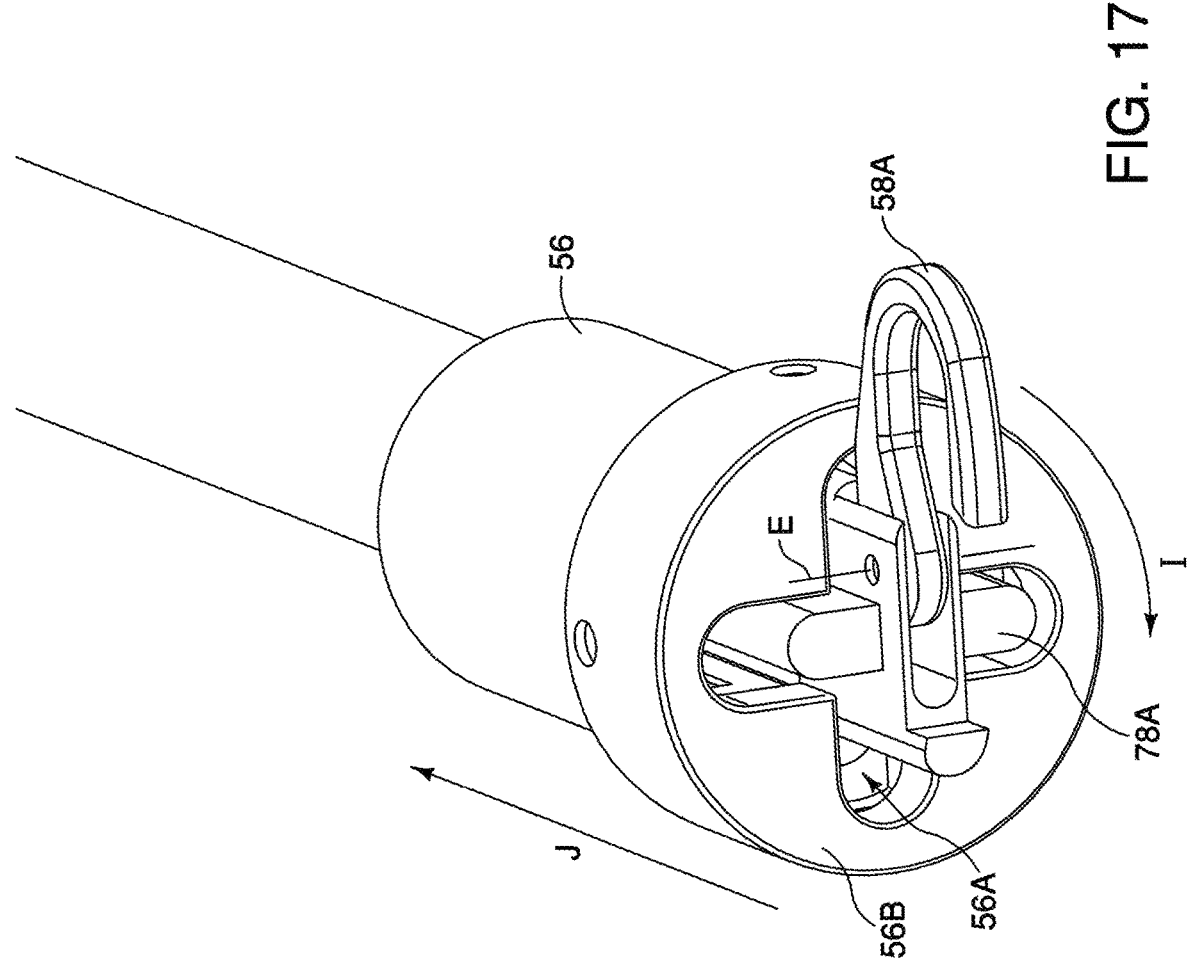
FIG. 17 is a close-up view of the head of the hot-stick tool of FIG. 14.

An actuating rod 76, which is also electrically insulating, extends from the sleeve 74 to the head 56 alongside the pole 54. The head end 76A of the rod 76 extends into the hot-stick head 56 through a corresponding bore or channel in the head, and is coupled to a rigid shuttle 78 slidably mounted in the head 56. The shuttle may be "X" shaped in cross section, or otherwise shaped, and slidably mounted snugly in corresponding shaped channels within head 56 so that twisting rotation of the pole 54 in direction D about longitudinal axis alpha causes corresponding twisting rotation of the shuttle 78. Thus, by way of example, as illustrated in FIGS. 16 and 17 the cross section of the shuttle may approximate an "X" shape, and slidably somewhat snugly mounted within a corresponding "X" shaped bore 56A extending through the head 56. The "X" shaped bore 56A is open at the distal end of the head 56 to allow the shuttle 78 to protrude therethrough. Bore 56A extends into the head 56 a sufficient distance to allow for the stroke length of the shuttle 78 as it firstly, retracts in direction J into the head 56 during coupling of the head 56 to the grounding clamp 10; and secondly, as the shuttle 78 is further retracted in direction J during unlocking of the clutch, as better described below.

Hook 58A is pivotally mounted, for example pinned, so as to pivot about axis E on the distal end 78A of the shuttle 78. When the distal end 78A of the shuttle 78 is positioned so as to protrude slightly from the distal end of the head 56, such as seen in FIG. 17, the hook 58A is free to pivot or rotate about axis E where the hook is hinged, for example by a pin or bolt, to the distal end of the shuttle. The rotation of the hook 58A about axis E may, in this embodiment, be described as lying in a plane which intersects the pole generally along its longitudinal axis.

Figure 14:
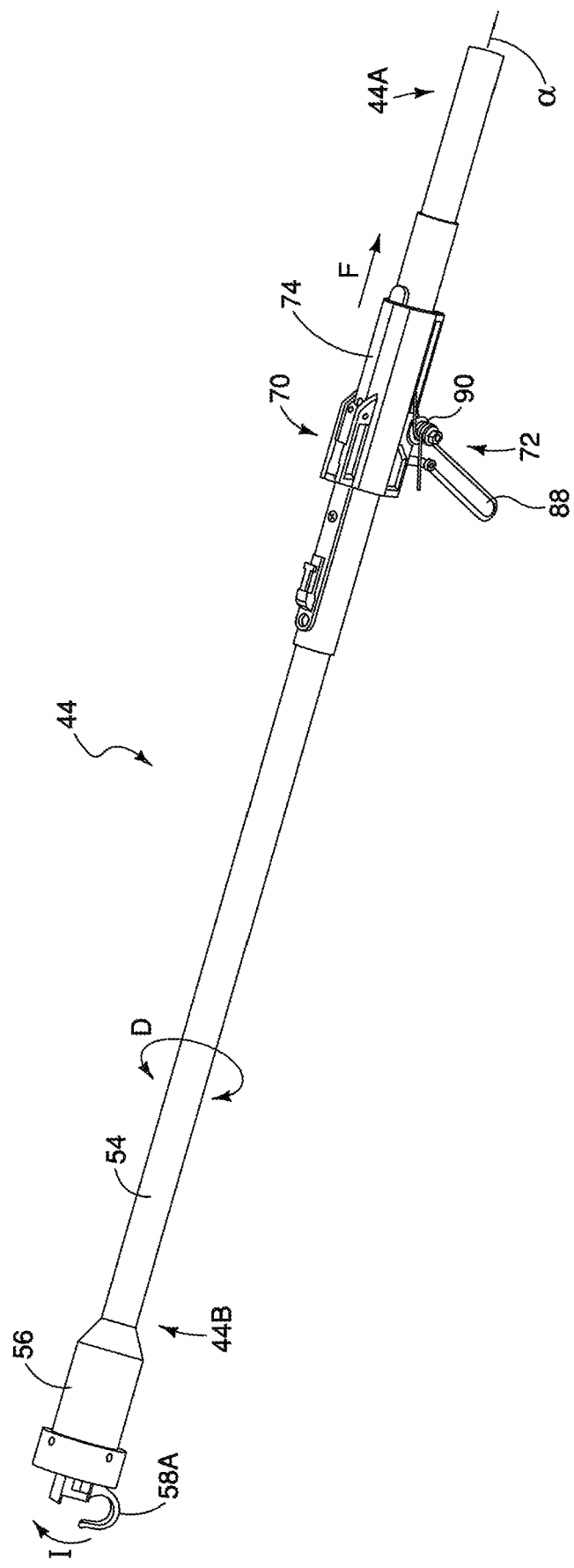
FIG. 14 is a perspective view of an embodiment of a hot-stick tool.
Figure 15:
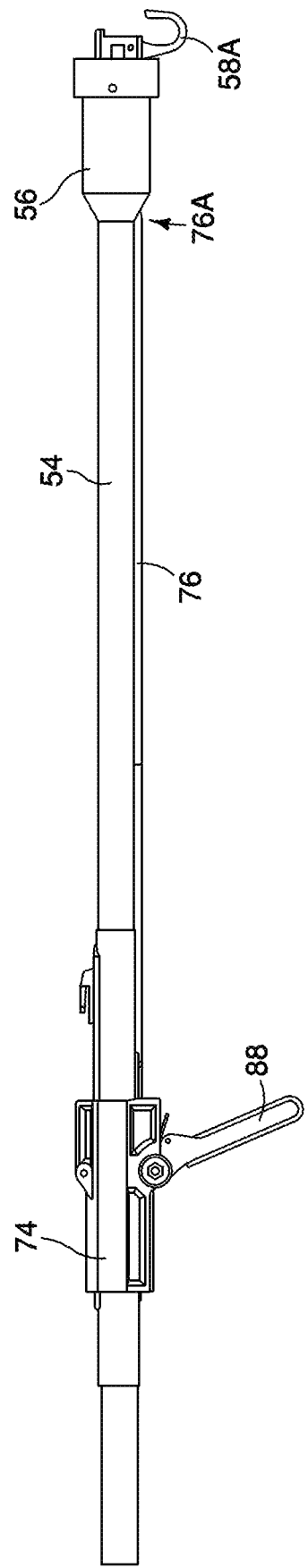
FIG. 15 is a side elevation view of the hot-stick tool shown in FIG. 14.
Figure 18:
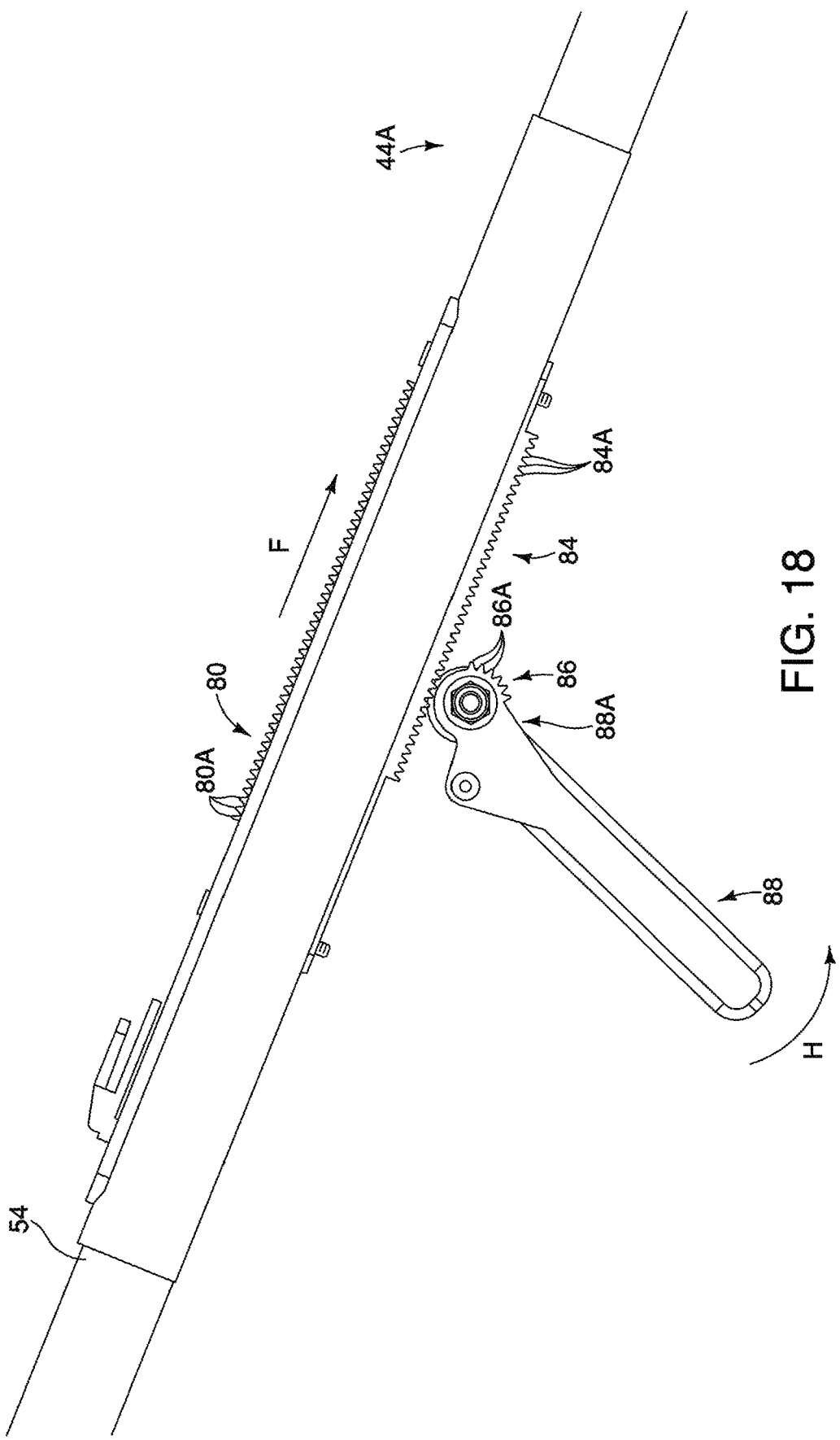
FIG. 18 is a close-up, partially cut-away view of a portion of the hot-stick tool shown in FIG. 14, displaying the first and second rails of the hot-stick tool.
Figure 19:
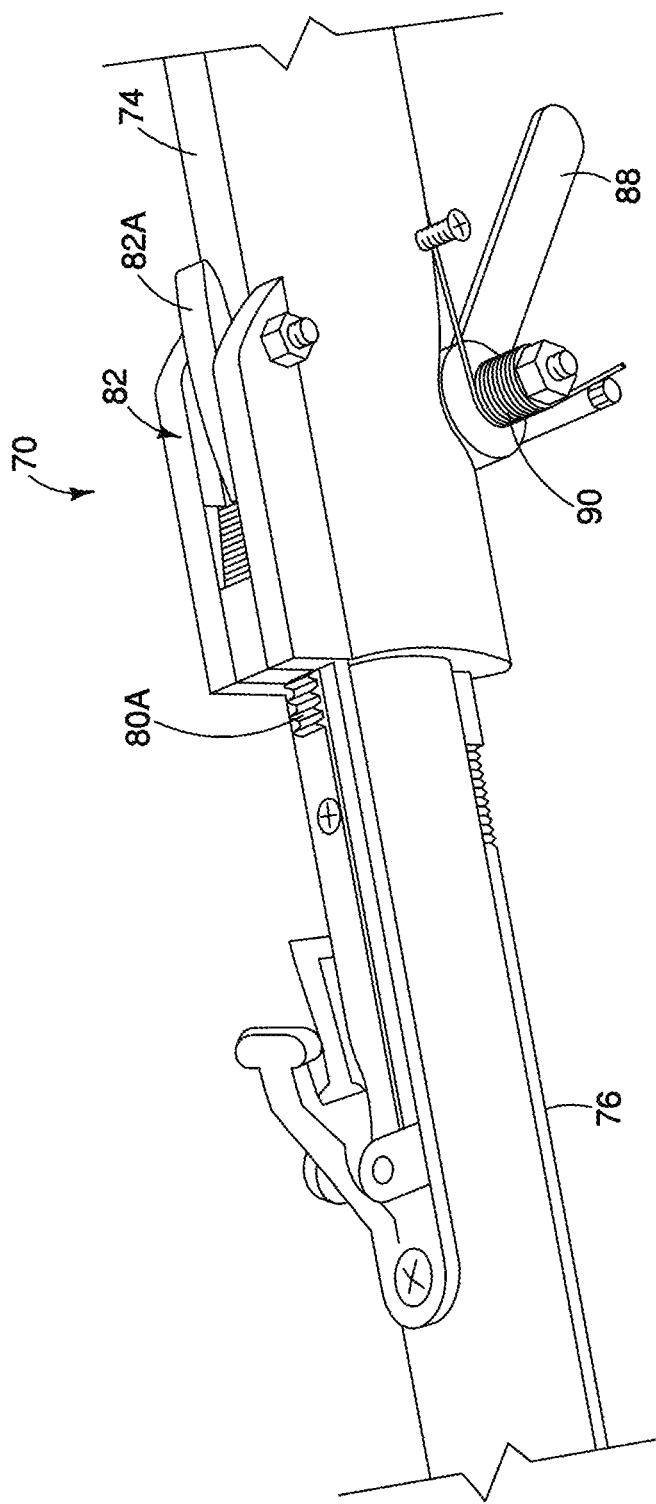
FIG. 19 is a close-up view of a portion of the hot-stick tool shown in FIG. 14, displaying the first and second actuators.

As illustrated in FIGS. 14, 18 and 19, the sleeve 74 is mounted so as to slide in direction F along a first toothed rail 80 on the pole 54. A latch 82, pivotally mounted on the sleeve 74 engages a pawl (not shown) with the teeth 80A on the rail 80. The pawl is spring biased so as to engage the teeth 80A on rail 80 to releasably lock the longitudinal position of the sleeve 74 along the pole 54. A lever 82A on the latch 82, when depressed against the sleeve 74, releases the pawl from engaging the teeth 80A, thereby releasing the sleeve 74 to slide along the pole 54.

A second toothed rail 84 is mounted on the opposite side of the pole 54 from the first toothed rail 80 as shown in FIG. 18. A partially toothed gear 86 is mounted at the base end 88A of a lever handle 88. Lever handle 88 is pivotally mounted onto, so as to be carried on, sleeve 74. Teeth 86A on gear 86 engage against and along the teeth 84A of second toothed rail 84 when engaged by the rotation about axis G of a lever handle 88 (see FIG. 20). The lever handle 88 is normally biased away from pole 54 in a direction opposite to direction H by a spring 90 into a non-engaged position, wherein the teeth 86A on gear 86 at the base end 88A of the lever handle 88 are disengaged from the teeth 84A on the second toothed rail 84. This is accomplished by using a short array of teeth 86A on gear 86. The short array of teeth 86A only engage the teeth 84A on the second toothed rail 84 when the lever handle 88 has been rotated towards sleeve 74 and pole 54 in direction H, about its axis of rotation G, which coincides with the centroidal axis of rotation of gear 86, against the return biasing force of spring 90. Lever handle 88 is seen in its resting, non-actuating position in FIGS. 14, 15 and 18.

Once the lever handle 88 has been rotated in direction H sufficiently, so as to engage the short array of teeth 86A on gear 86 engage the teeth 84A of the second toothed rail 84, further rotation of the lever handle 88 drives the sleeve 74 in direction F so as to translate the sleeve 74 further down the pole 54 towards its handle end 44A thereby drawing the rod 76 and its connected shuttle 78 and hook 58A with it. This sliding in direction F of the sleeve 74, rod 76, and hook 58A pulls the hook 58A a short distance into bore 56A of head 56 sufficient to unlock the clutch formed of first and second locking members 28, 30 (hereinafter, collectively referred to as clutch 28, 30) in the grounding clamp assembly when the hook 58A is engaged in the eye 32 of the clutch release mechanism.

In use, the grounding clamp assembly 10 is first coupled to the head 56 of the hot-stick 44. To do this, the hook 58A, when the shuttle 78 is extended from the head bore 56A, is hooked through the eye 32 of the clutch release mechanism. The sleeve 74 is then slid by the lineman down the pole 54 in direction F with the ratchet lever 82A depressed until the shuttle 78 retracts completely into the head bore 56A. This causes the hook 58A to rotate in direction I into its locked position. Drawing the hook 58A down into the bore 56A in the head 56 thereby also pulls the eye 32 of the clutch release mechanism down into the bore 56A of the head 56, until the base 42 of the spring housing 34 on the grounding clamp assembly 10 seats down snugly against the face 56B of the head 56. This completes the coupling of grounding clamp 10 onto hot-stick 44.

At this point, the lineman releases the spring loaded latch lever 82A, thereby engaging the latch pawl (not shown) with the teeth 80A of the first toothed rail 80, locking the position of the sleeve 74 along the pole 12. The clutch 28, 30 in the grounding clamp assembly 10 remains locked until a significant tension force is subsequently applied to pull the eye 32 of the clutch release mechanism further into the bore 56A of the head 56 by a sufficient distance so as to unlock and release the clutch 28, 30. In the case of a toothed clutch 28A, 30A, such as seen by way of example in FIG. 4A, this further distance the eye 32 must be pulled may be, for example, ⅛ inch, sufficient to release the interlocking opposed-facing crown gear teeth 46, 48 of the clutch 28A, 30A. To move the crown gear teeth 46, 48 apart by this short distance, the lineman rotates the lever handle 88 on the sleeve 74 in direction H to engage the array of teeth 86A in a corresponding sector of gear 86 in the manner of a pinion against and along a correspondingly short distance along the second toothed rail 84. The spring strength of spring 40 of the clutch release mechanism resisting the movement of the eye 32 into the head bore 56A upon actuation of the lever handle 88 may be in the order of 100 pounds-force (100 lbf). The required force to compress spring 40 is sufficiently high enough such that manual pulling of the eye 32 by hand by the lineman, so as to release the clutch 28A, 30A, is impossible without the aid of a tool. Using the lever handle 88, the lineman exerts the required pulling force on the eye 32 (for example, 100 lbf) so as to overcome the spring strength of spring 40, collapsing the spring 40 and unlocking the clutch 28A, 30A.

Figure 20:
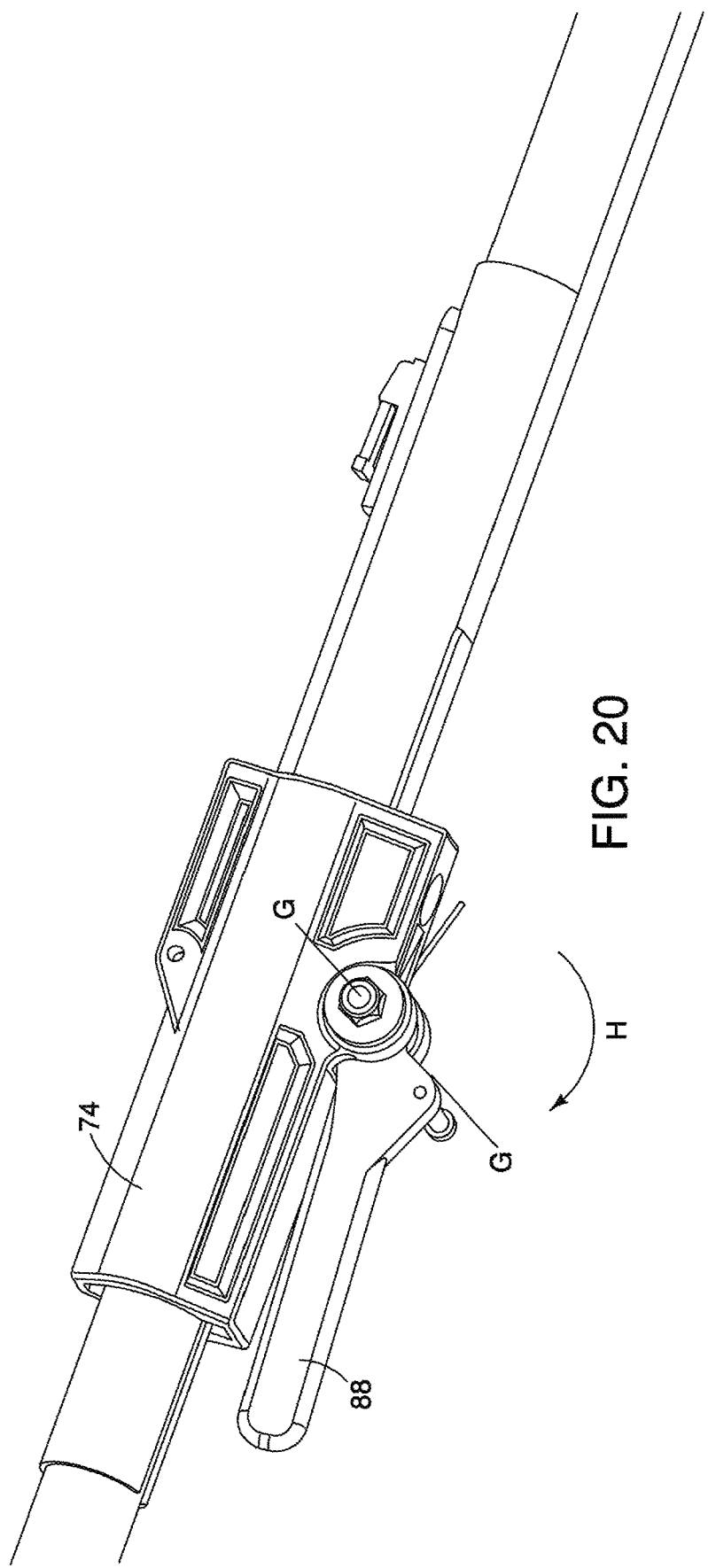
FIG. 20 is a close-up view of a portion of the hot-stick tool shown in FIG. 14, displaying the second actuator in a locked position.
Figure 21:
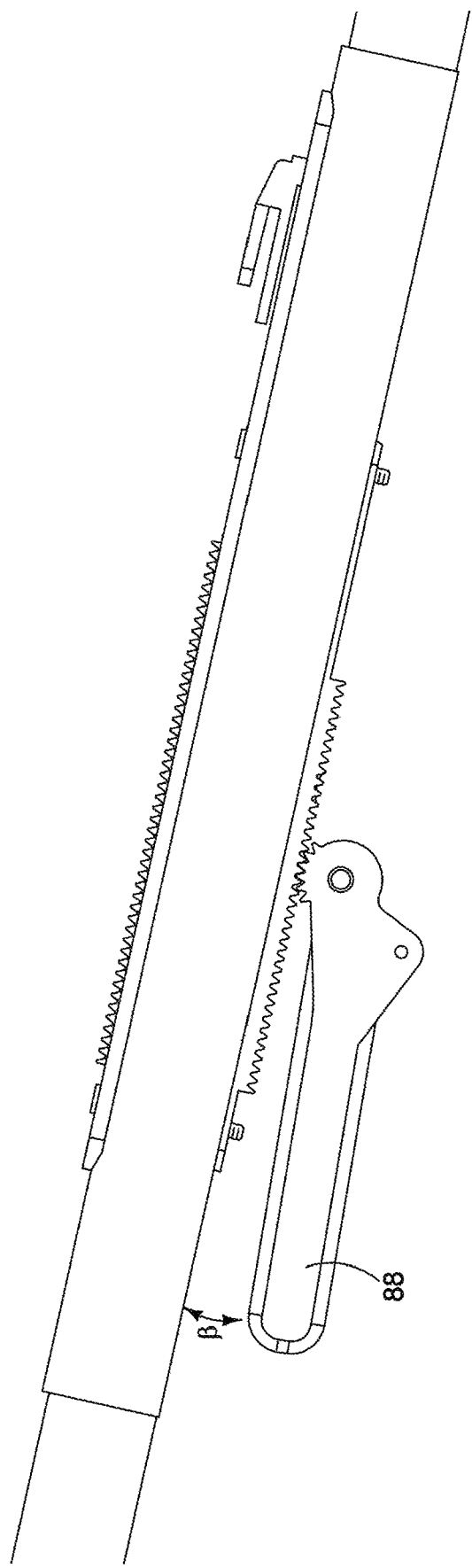
FIG. 21 is a close-up, partially cut-away view of the portion of the hot-stick tool shown in FIG. 20, displaying the first and second rails of the hot-stick tool with the second actuator in a locked position.
Figure 22:
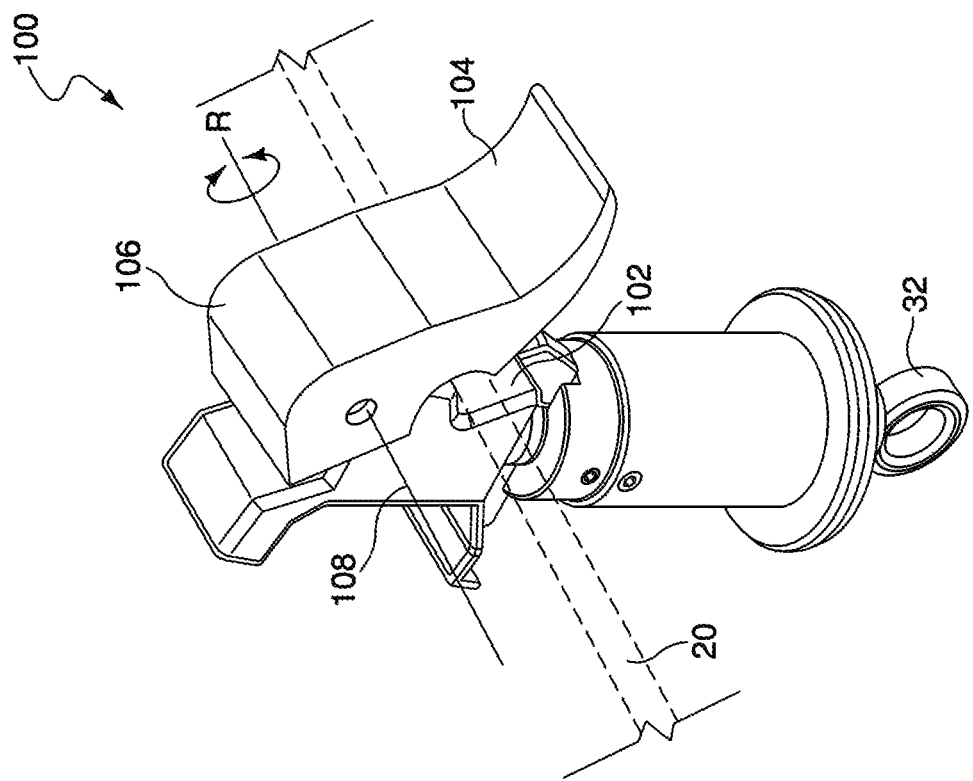
FIG. 22 is a perspective view of a further embodiment of a locking grounding clamp.

With the clutch 28, 30 unlocked, the lineman may then twist the pole 54 about its longitudinal axis in direction D to open or close the clamp 10 so as to release or capture a conductor 20 in the capture cavity 18A of the clamp. The twisting of the pole 54 by the lineman is done while maintaining pressure on the lever handle 88 in direction H while lever handle 88 is in its clutch release position, such as illustrated in FIGS. 20-21. In the preferred embodiment illustrated, the lever handle 88, when in the clutch release position, is almost flush along the sleeve 74 so that grasping of both the sleeve 74 and the lever handle 88 may be done with one hand.

The lever handle 88 is, in a preferred embodiment, not completely flush against sleeve 74, but rather is inclined away from being flush along the sleeve by a small angle beta (β). The remaining travel of the lever handle 88, so as to position it flush against the sleeve 74, may, in an embodiment, release the short array of teeth 86A in the corresponding sector of gear 86 forming the pinion on the end 88A of the lever handle 88 from engagement within the teeth 84A on the second toothed rail 84, thereby disengaging the force acting on the sleeve 74 and allowing the clutch 28, 30 to relock under the force of spring 40 as the pulling force on the eye 32 is removed. This removes the corresponding large resistive force of the latch 82 on the sleeve 74 acting on the first toothed rail 80. Without removing this force, releasing the ratchet on latch 82 may be difficult.

When the clutch 28, 30 is released, a lineman wishing to capture a conductor 20 within a grounding clamp mounted to the head 56 of hot-stick 44, such as for example the embodiment of the ground clamp 100 illustrated in FIGS. 10-13 and 22, may now do so. With the clamp 100 open, the lineman seats the conductor 20 against the fixed jaw 102 on the clamp body 108, and then twists the pole 54 in a first direction (direction D) about the pole's longitudinal axis so as to rotate a threaded shaft 36 threadably journaled in a threaded bore in the clamp body 108. Rotation of the threaded shaft 36 drives the threaded shaft through the bore so as to push against the arm 106 of a pivoting (i.e. movable) jaw 104, pivotally mounted on the clamp body 108. Pushing against the arm 106 rotates the pivoting jaw 104 about axis of rotation R, thereby closing the pivoting jaw 104 against the conductor and clamping the conductor between the fixed and pivoting jaws 102, 104 respectively. The procedure described above is not limited to utilizing the embodiment of the ground clamp 100, and the above procedure may also be carried out with any of the other embodiments of the ground clamp disclosed herein.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An electrically insulated pole for use in a grounding clamp system which includes a grounding clamp having at least one movable jaw and a first actuator to selectively close and open the at least one movable jaw relative to a second jaw whereby a conductor is selectively captured and released from the clamp, respectively, and a selectively releasable lock-out to prevent operation of the first actuator while the lock-out is locked and to enable operation of the actuator while the lock-out is released, the electrically insulated pole comprising:
    a dielectric pole having a head at a head end of the pole, and an opposite handle end, opposite to the head end, a coupler mounted in the head and having a corresponding actuating linkage extending from the head along the pole,
    second and third actuators mounted on the handle end of the pole,
    wherein the second actuator cooperates with the actuating linkage to actuate the coupler,
    wherein actuation of the second actuator engages the coupler with the lock-out and draws the lock-out onto the head so as to couple the grounding clamp onto the head, and
    wherein the third actuator further cooperates with the actuating linkage and is adapted to be actuated sequentially after the actuation of the second actuator so as to release the lock-out thereby allowing actuation of the first actuator.

2. The pole of claim 1 wherein the lockout includes a clutch and the clutch includes two mating members, wherein a second mating member of the two mating members is coupled to a pull, and wherein the coupler in the head of the pole is adapted to engage with the pull, and wherein when the coupler is said engaged with the pull, the actuation of the third actuator tensions the pull, so as to disengage the two mating members from one another to thereby release the clutch upon the tension on the pull.

3. The system of claim 2 wherein the second actuator provides a first stage pulling tension on the pull, via the linkage, sufficient to rigidly couple the grounding clamp onto the head of the pole and to substantially align the pull with the pole.

4. The system of claim 3 wherein the third actuator sequentially further tensions the pull after actuation of the second actuator so as to overcome a spring force acting on the clutch to keep the clutch locked.

5. The system of claim 4 wherein the second actuator includes a first toothed rail and a ratchet cooperating therewith to selectively position the sleeve along the pole and to selectively lock the position of the sleeve along the first toothed rail.

6. The system of claim 5 wherein the third actuator includes a second toothed rail and a pinion to apply the said sequential further tension to the pull.

7. The system of claim 6 wherein a lever is mounted to the pinion to provide mechanical advantage for the pinion whereby the sequential further tension on the pull is sufficient to overcome the spring force acting on the clutch.

8. The system of claim 7 wherein the pinion has teeth therearound in mating engagement with corresponding teeth on the second toothed rail, and wherein the teeth on the pinion only occupy a sector around the pinion such that moving the lever from a first pull tensioning position to a second pull tensioning position, wherein the second pull tensioning position coincides with unlocking of the lock-out, rotates the pinion's teeth along the sector, and wherein moving the lever beyond the second pull tensioning position to a release position releases the pinion's teeth as the toothed sector is rotated out of engagement with the teeth on the second toothed rail, resulting in release of the tensioning of the pull by the third actuator.

9. The pole of claim 1 wherein the second actuator is a selectively translatable sleeve slidably mounted on the pole, and wherein the actuating linkage is coupled to the sleeve so that translation of the sleeve along the pole translates the linkage correspondingly.

10. The pole of claim 9 wherein the actuating linkage includes a rod, and wherein the coupler includes a hook, and wherein the hook is mounted to a shuttle, the shuttle is coupled to the rod and is slidably mounted within the head so that the translation of the rod by the translation of the sleeve translates the shuttle within the head correspondingly.

11. The system of claim 10 wherein the hook is pivotally mounted on the shuttle so that retraction of the shuttle into the head causes the hook to rotate into a closed position.

12. The system of claim 11 wherein the pull is adapted to releasably couple to the hook and to be locked into the head upon retraction of the shuttle by retraction of the sleeve along the pole.

* * * * *